(12) United States Patent
Chen et al.

(10) Patent No.: US 9,043,911 B1
(45) Date of Patent: May 26, 2015

(54) DISTRIBUTED LEARNING AND AGING FOR MANAGEMENT OF INTERNET PROTOCOL (IP) ADDRESSES

(71) Applicant: Juniper Networks, Inc., Sunnyvale, CA (US)

(72) Inventors: Chao Chen, Beijing (CN); Xiao Ping Zhu, Beijing (CN); Huaxiang Yin, Beijing (CN); Zheling Yang, Beijing (CN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/147,251

(22) Filed: Jan. 3, 2014

(51) Int. Cl.
*H04L 29/06* (2006.01)

(52) U.S. Cl.
CPC .................................. *H04L 63/1408* (2013.01)

(58) Field of Classification Search
USPC ....................................................... 726/22, 23
See application file for complete search history.

(56) References Cited

U.S. PATENT DOCUMENTS

| | | | |
|---|---|---|---|
| 7,929,545 B2* | 4/2011 | Martinotti et al. ......... 370/395.3 |
| 8,103,800 B2* | 1/2012 | Tzeng et al. .................. 709/250 |
| 8,155,150 B1 | 4/2012 | Chung et al. |
| 8,261,355 B2* | 9/2012 | Rayes et al. ..................... 726/25 |
| 8,429,749 B2* | 4/2013 | Takahashi et al. .............. 726/24 |
| 8,667,177 B2* | 3/2014 | Doshi et al. ................... 709/242 |
| 8,826,414 B2* | 9/2014 | Yoo ................................. 726/13 |

\* cited by examiner

*Primary Examiner* — Beemnet Dada
(74) *Attorney, Agent, or Firm* — Harrity & Harrity, LLP

(57) ABSTRACT

A device includes a security process unit (SPU) associated with a logical ring of SPUs. The SPU receives a packet with an address associated with a malicious source, and creates, based on the packet, an entry in a data structure associated with the SPU. The entry includes information associated with the packet. The SPU provides an install message to a next SPU in the logical ring. The install message instructs the next SPU to create the entry in another data structure, and forward the install message to another SPU. The SPU receives the install message from a last SPU, and sets a state of the entry to active in the data structure based on receiving the install message from the last SPU. The SPU performs a particular action on another packet, associated with the malicious source, based on the setting the state of the entry to active.

20 Claims, 18 Drawing Sheets

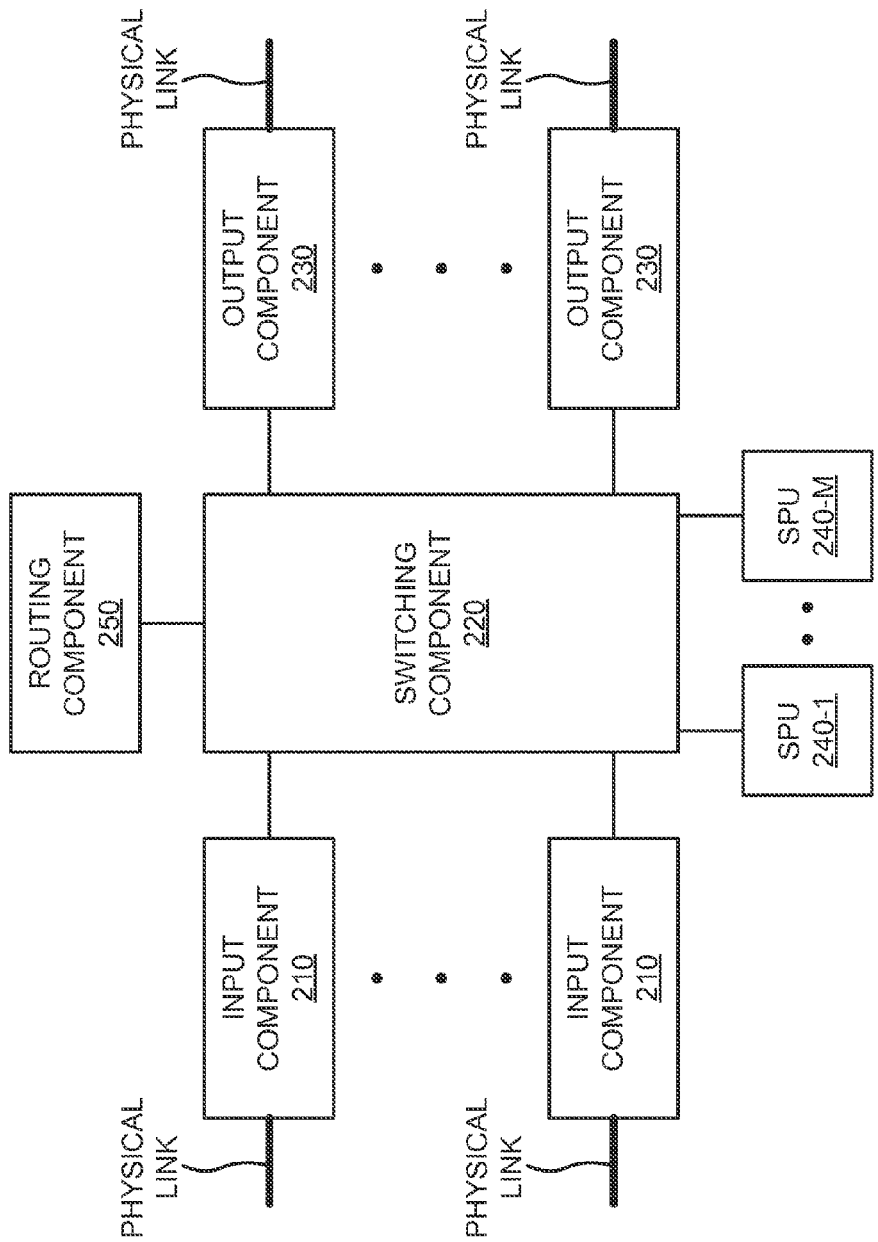

FIG. 5C

IP ACTION DATA
STRUCTURE (335)

| No. | Address | Timeout | State |
|-----|---------|---------|-------|
| 1 | 169.16.128.1 | 50 | Active |
| 2 | 168.32.254.2 | 150 | Active |
| 3 | 172.16.254.1 | 300 | *Active* ← Set state to active (570) |
| ⋮ | ⋮ | ⋮ | ⋮ |

500

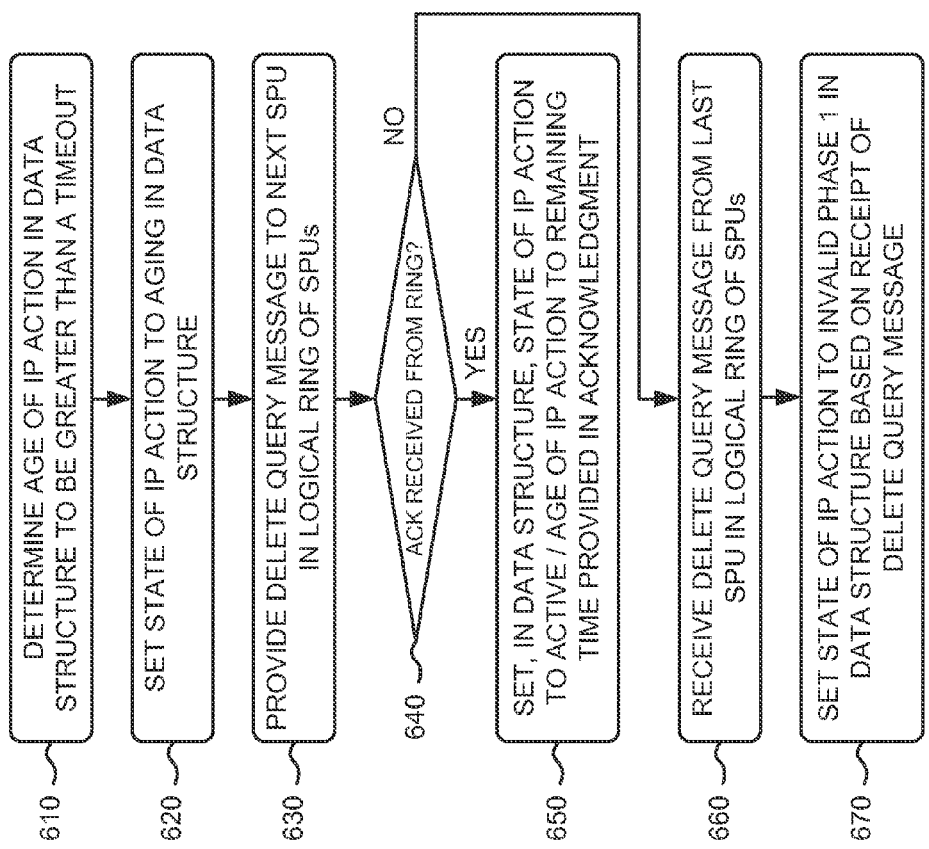

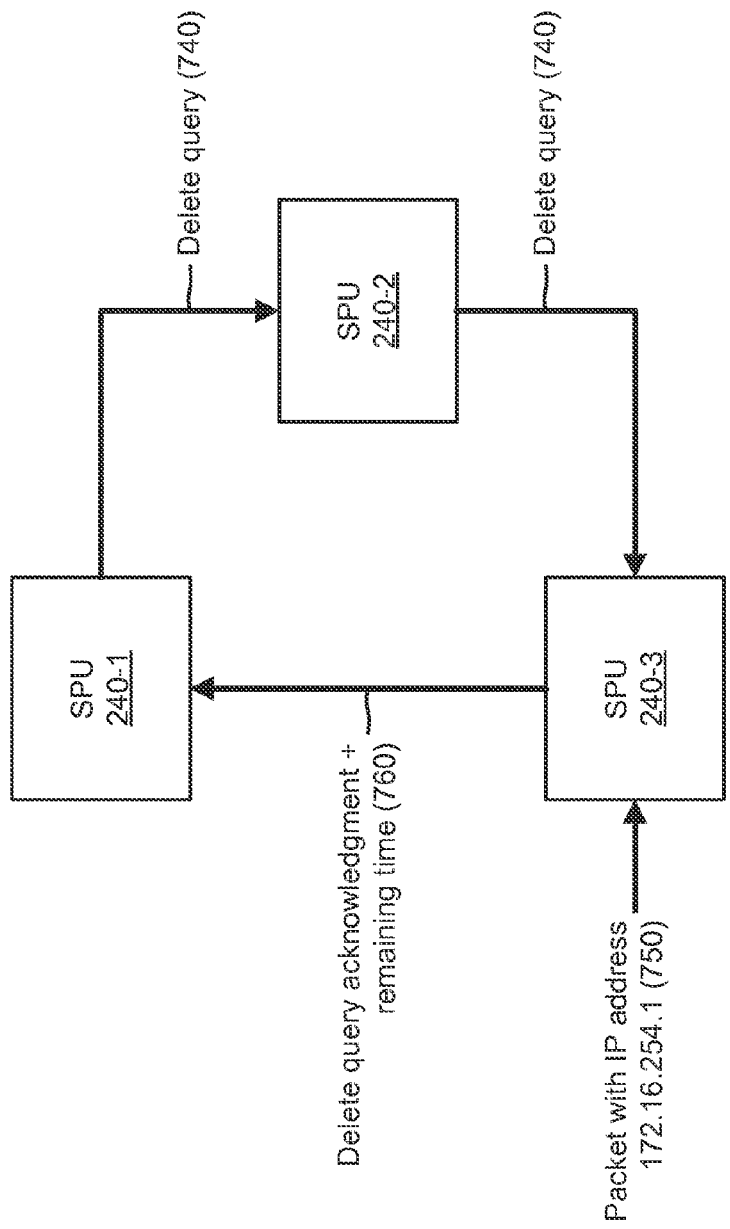

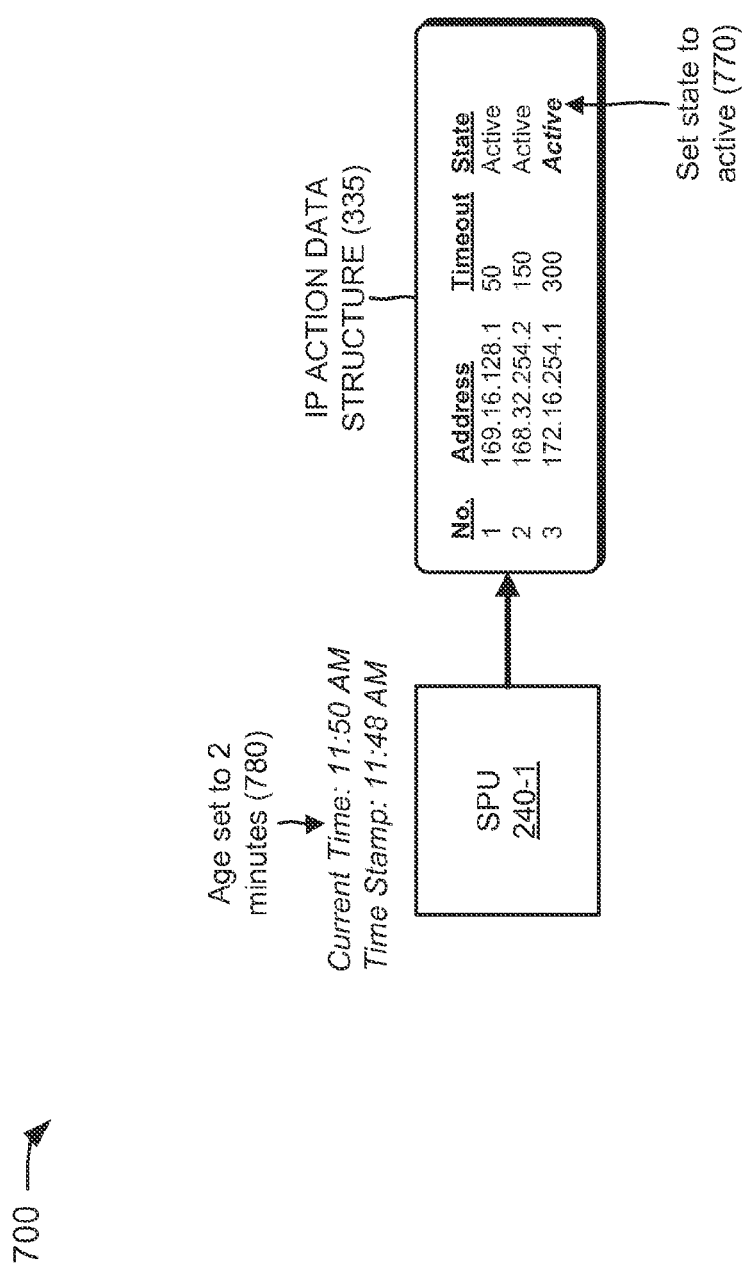

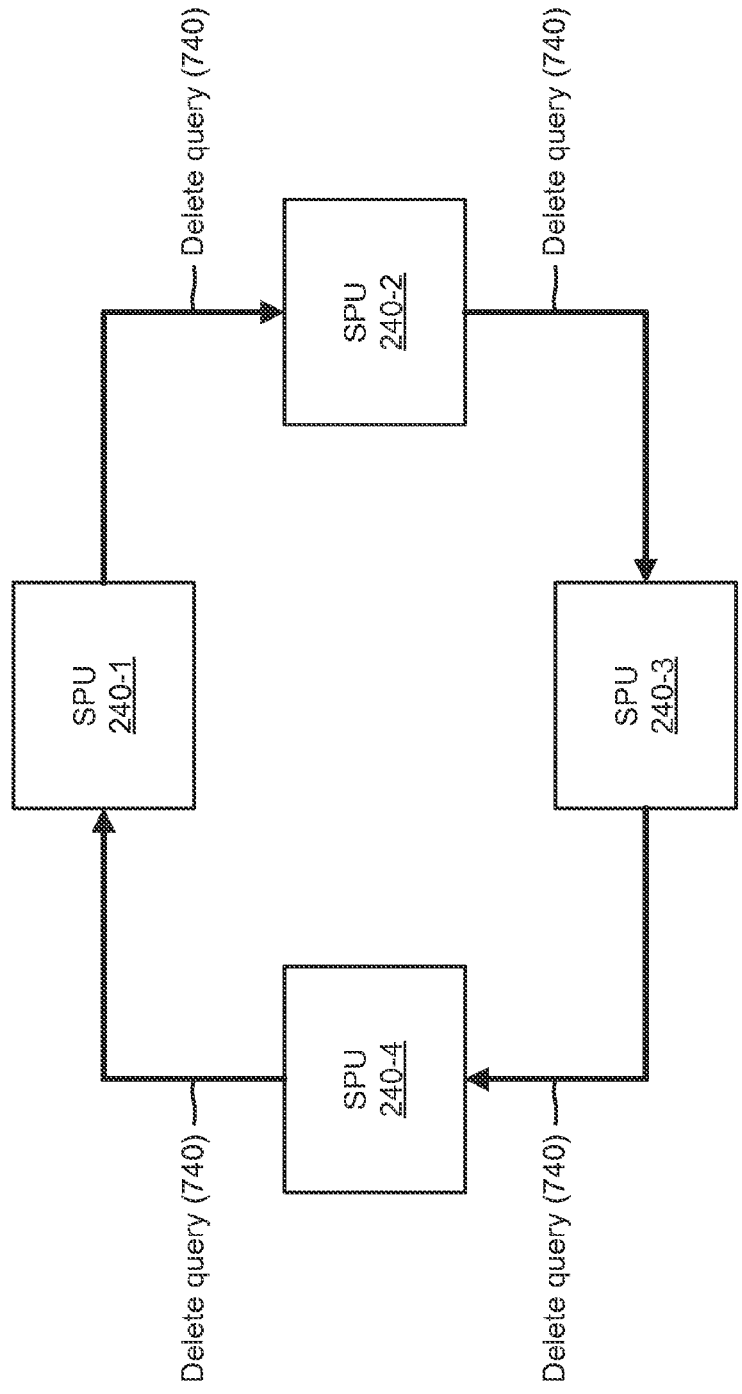

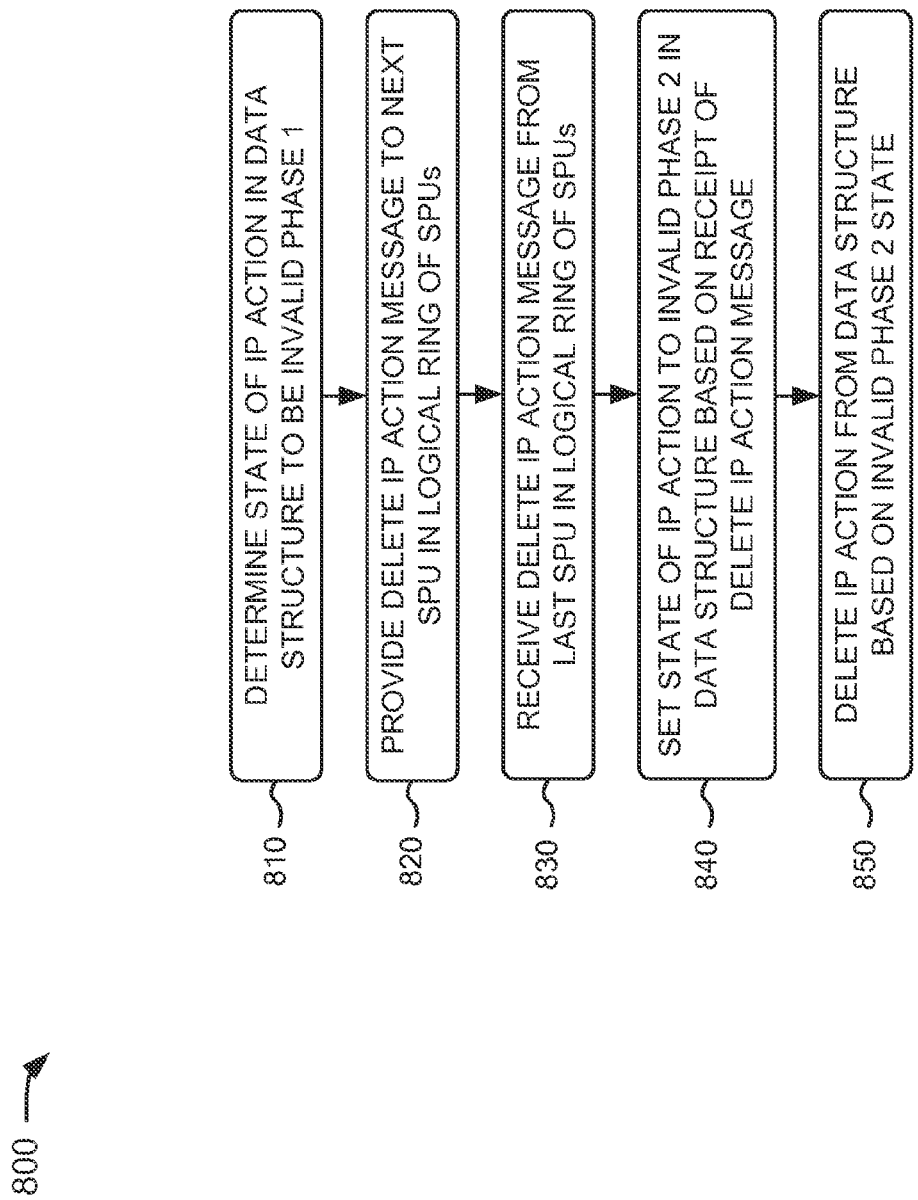

DISTRIBUTED LEARNING AND AGING FOR MANAGEMENT OF INTERNET PROTOCOL (IP) ADDRESSES

BACKGROUND

Network attacks by hackers are on the rise, and network administrators use different methods and techniques to prevent the hackers from obtaining access to unauthorized information. Many times a hacker is identified and blocked in a firewall or other network device. The hacker may include a system, a compromised device, etc. that performs malicious network activity (e.g., packet sniffing, password cracking, phishing, spreading a virus, spreading a Trojan horse, etc.). A network device may identify a compromised device's Internet protocol (IP) address, and may block or drop packets associated with the IP address if the comprised device attempts to access the network in the future. A layer 2 (L2) switch is a network device that receives a packet containing data or control information on one port and, based on a media access control (MAC) address contained within the packet, transmits the packet via another port. A L2 switch may include a single central processing unit (CPU) or multiple CPUs referred to as security process units (SPUs).

SUMMARY

In some implementations, a method may include receiving, by a device, a packet with an address associated with a malicious source, The device may include security process units (SPUs) arranged in a logical ring of SPUs, and a particular SPU, of the logical ring of SPUs, may receive the packet. The method may include creating, by the particular SPU and based on the packet, an action entry in a data structure associated with the particular SPU, where the action entry includes information associated with the packet. The method may include setting, by the particular SPU, a state of the action entry to pending in the data structure, and providing, by the particular SPU and based on setting the state of the action entry to pending, an install message to a next SPU in the logical ring of SPUs. The install message may instruct the next SPU to create the action entry in another data structure associated with the next SPU, and forward the install message to another SPU in the logical ring of SPUs. The method may include receiving, by the particular SPU, the install message from a last SPU in the logical ring of SPUs, and setting, by the particular SPU, the state of the action entry to active in the data structure based on receiving the install message from the last SPU. The device may perform a particular action on another packet, associated with the malicious source, based on setting the state of the action entry to active.

In some implementations, a device may include a memory to store a data structure, and a security process unit (SPU), associated with a logical ring of SPUs, to receive a packet with an address associated with a malicious source, and create, based on the packet, an action entry in the data structure. The action entry may include information associated with the packet. The SPU may set a state of the action entry to pending in the data structure, and may provide, based on setting the state of the action entry to pending, an install message to a next SPU in the logical ring of SPUs. The install message may instruct the next SPU to create the action entry in another data structure associated with the next SPU, and forward the install message to another SPU in the logical ring of SPUs. The SPU may receive the install message from a last SPU in the logical ring of SPUs, and may set the state of the action entry to active in the data structure based on receiving the install message from the last SPU. The SPU may perform a particular action on another packet, associated with the malicious source, based on the setting the state of the action entry to active.

In some implementations, a non-transitory computer-readable medium may store instructions that include one or more instructions that, when executed by a security process unit (SPU), associated with a logical ring of SPUs of a device, cause the SPU to: receive a packet with an address associated with a malicious source, and create, based on the packet, an action entry in a data structure associated with the particular SPU. The action entry may include information associated with the packet. The one or more instructions may further cause the SPU to provide an install message to a next SPU in the logical ring of SPUs. The install message may instruct the next SPU to create the action entry in another data structure associated with the next SPU, and forward the install message to another SPU in the logical ring of SPUs. The one or more instructions may cause the SPU to receive the install message from a last SPU in the logical ring of SPUs, and set a state of the action entry to active in the data structure based on receiving the install message from the last SPU. The one or more instructions may further cause the SPU to perform a particular action on another packet, associated with the malicious source, based on the setting the state of the action entry to active.

BRIEF DESCRIPTION OF THE DRAWINGS

The accompanying drawings, which are incorporated in and constitute a part of this specification, illustrate one or more implementations and, together with the description, explain these implementations. In the drawings:

FIG. 2 is a diagram of example components of a device in which systems and/or methods, described herein, may be implemented;

FIGS. 5A-5C are diagrams of an example relating to the example process shown in FIG. 4;

FIG. 6 is a flow chart of an example process for initiating deletion of an IP action entry, associated with a packet, from multiple SPUs;

FIGS. 7A-7E are diagrams of an example relating to the example process shown in FIG. 6;

FIG. 8 is a flow chart of an example process for completing deletion of an IP action entry, associated with a packet, from multiple SPUs.

DETAILED DESCRIPTION

The following detailed description refers to the accompanying drawings. The same reference numbers in different drawings may identify the same or similar elements.

To facilitate blocking IP addresses or other types of addresses (e.g., associated with malicious sources), a L2 switch may perform IP address learning. IP address learning refers to a process for reducing network traffic, where the IP address is recorded in an IP address data structure (e.g., a table, a database, a list, etc.) referred to as an IP action data structure. This helps prevent future packets associated with IP addresses from being forwarded in the network. Learned IP addresses may be stored in an IP action data structure of finite capacity. Typically, once a maximum number of IP addresses is reached, new entries are not accepted or the earliest stored entries are overwritten with new information. To avoid rejection of new entries or overwriting, an aging period may be defined for each IP action data structure entry so that unused IP addresses are discarded to create space for new information. This aging period may be considered a maximum time during which an entry in the IP action data structure is valid.

In a typical L2 switch with a single CPU or center point, the CPU can age out an IP address if there is no activity, associated with the IP address, for the duration of the aging period. However, for multi-SPU switches, the IP address learning/aging function may be distributed among multiple SPUs. Thus, if an IP address entry ages out at one SPU, the other SPUs must first be consulted before the entry may be deleted. Thus, the IP address learning/aging functions in a distributed multi-SPU L2 switch may require an undesirable amount of internal message traffic.

Figure 1A:
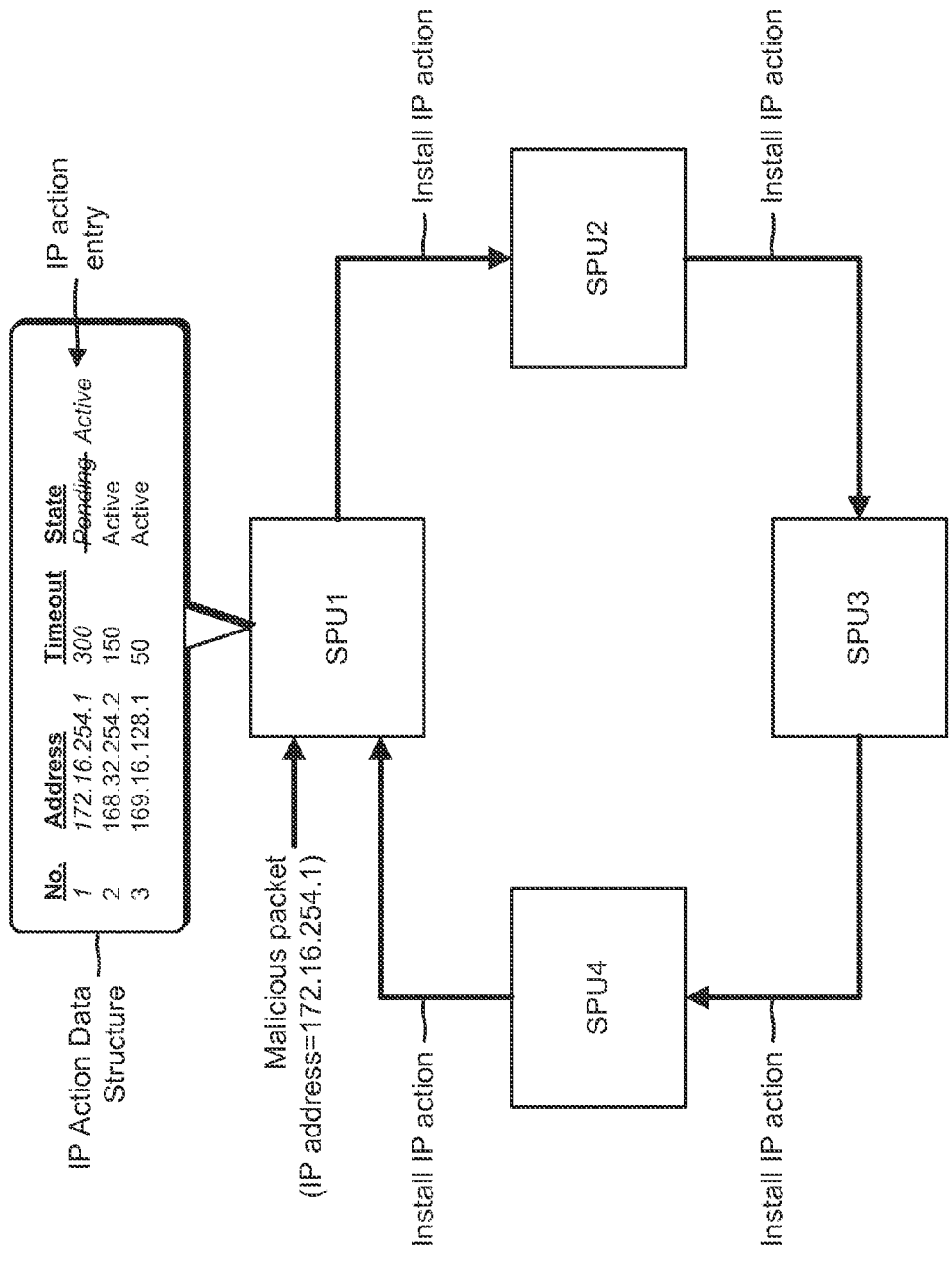
FIGS. 1A and 1B are diagrams of an overview of an example implementation described herein.
Figure 1B:
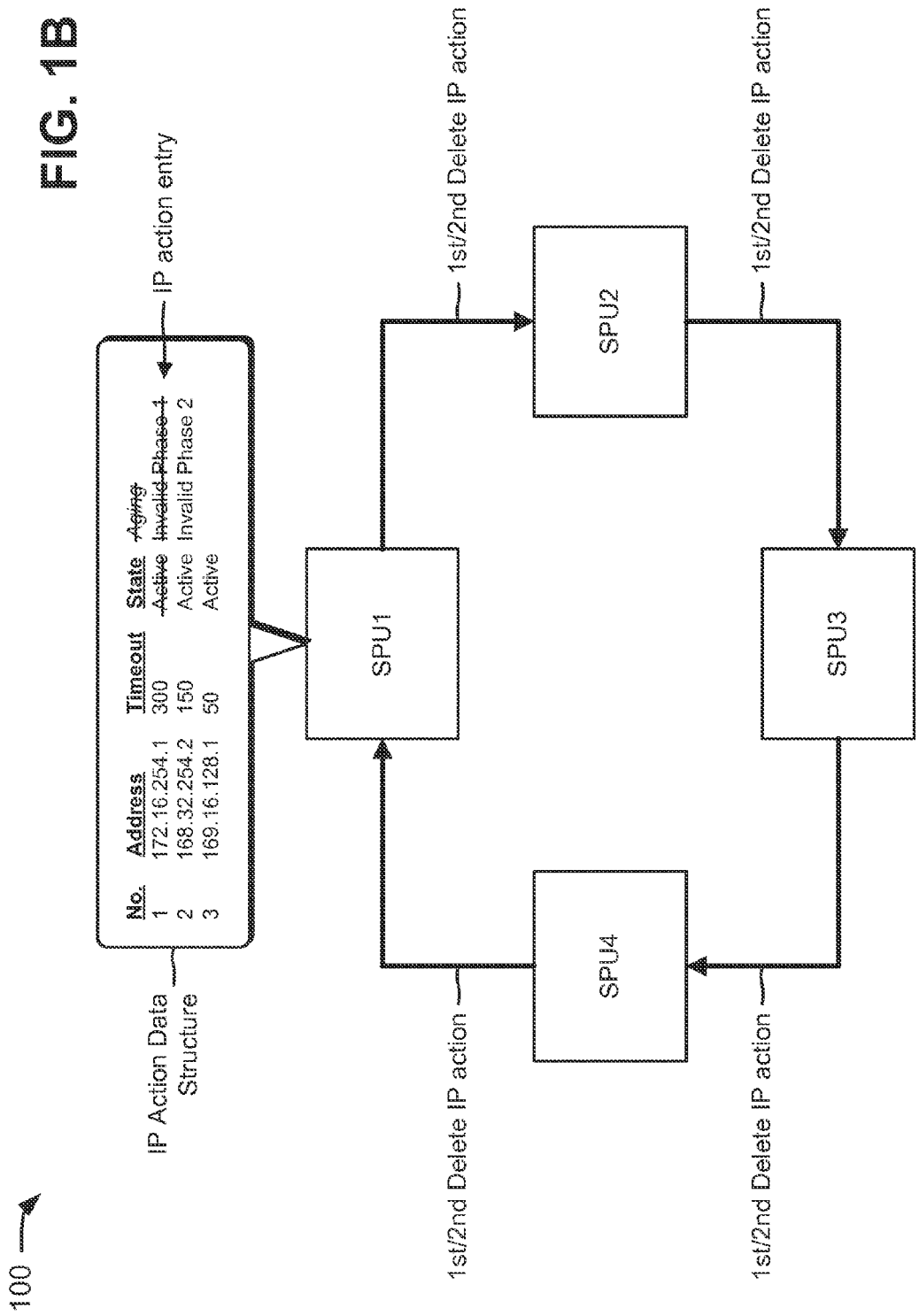

FIGS. 1A and 1B are diagrams of an overview of an example implementation 100 described herein. In example implementation 100, assume that a device includes multiple SPUs, such as a first SPU (SPU1), a second SPU (SPU2), a third SPU (SPU3), and a fourth SPU (SPU4) arranged in a logical ring, as shown in FIG. 1A. Further, assume that SPU1 receives a packet identified as being received from a malicious source with an IP address of 172.16.254.1. When the IP address is received, SPU1 may be considered the owner of the IP action entry, and may create an entry in an IP action data structure (e.g., a table) for the IP address. As further shown in FIG. 1A, the IP action entry may include an IP action number (e.g., 1), the IP address (e.g., 172.16.254.1), a timeout or aging time period (e.g., "300" seconds), and a state (e.g., initially set to "pending").

SPU1 may generate an install IP action message that instructs the other SPUs to create an entry for the IP address in IP action data structures associated with the other SPUs. SPU1 may provide the install IP action message to the next SPU in the logical ring of SPUs (e.g., to SPU2), as further shown in FIG. 1A. SPU2 may create an entry for the IP address in an IP action data structure associated with SPU2, and may set the state of the entry to "passive" since SPU2 is not the owner of the IP action entry. SPU2 may provide the install IP action message to the next SPU in the logical ring of SPUs (e.g., to SPU3). SPU3 and SPU4 may perform the same operations as SPU2, based on the install IP action message. SPU4 may return the install IP action message to SPU1, as further shown in FIG. 1A. When SPU1 receives the install IP action message, SPU1 may determine that the IP address has been distributed to the other SPUs, and may change the state of the IP action entry from "pending" to "active" (e.g., indicating that any packets with the IP address are to be blocked or dropped by the device).

Now assume that the entry for the IP address has been active for more than the timeout time period (e.g., more than "300" seconds). When the IP address has been active for more than the timeout time period, SPU1 may set the state of the IP action entry from "active" to "aging" in the data structure, and may begin a process to delete the IP action entry. For example, SPU1 may provide a first delete IP action message to SPU2, as shown in FIG. 1B. The first delete IP action message may cause the other SPUs to determine whether the IP action entry is ready to be deleted in the other SPUs of the logical ring. If the other SPUs determine that the IP action entry is ready to be deleted, SPU2 may provide the first delete IP action message to SPU3, and SPU3 may provide first delete IP action message to SPU4. SPU4 may return the first delete IP action message to SPU1.

When SPU1 receives the first delete IP action message, SPU1 may set the state of the IP action entry from "aging" to "invalid phase 1" in the data structure, and may provide a second delete IP action message to SPU2, as further shown in FIG. 1B. The second delete IP action message may instruct the other SPUs of the logical ring to set the state of the IP action entry to "invalid phase 1," which may cause the other SPUs to delete the IP action entry. SPU2 may provide the second delete IP action message to SPU3, and SPU3 may provide second delete IP action message to SPU4. SPU4 may return the second delete IP action message to SPU1. When SPU1 receives the second delete IP action message, SPU1 may set the state of the IP action entry from "invalid phase 1" to "invalid phase 2" in the data structure, which may cause SPU1 to delete the IP action entry.

Such a device may provide simple and effective management of IP addresses via distributed learning and aging. Management may be simplified since a single SPU may maintain ownership of an IP action entry, and ownership may not switch to other SPUs. Furthermore, the owner SPU may ensure that an IP action entry is distributed to the other SPUs since the owner SPU may continuously attempt to install the IP action entry until the owner SPU receives an install IP action message from the other SPUs. In some implementations, systems and/or methods described herein may provide simple and effective management of other types of information (e.g., other than IP addresses) via distributed learning and aging.

FIG. 2 is a diagram of example components of a device 200 in which systems and/or methods, described herein, may be implemented. In some implementations, device 200 may include a network device, such as a gateway, a router, a switch, a firewall, a network interface card (NIC), a hub, a bridge, a proxy server, an optical add-drop multiplexer (OADM), or some other type of device that processes and/or transfers traffic. As illustrated, device 200 may include input components 210, a switching component 220, output components 230, security process units (SPUs) 240-1 through 240-M (collectively referred to herein as SPUs 240, and, in some instances, singularly as SPU 240), and a routing component 250.

Input components 210 may be points of attachment for physical links and may be points of entry for incoming traffic, such as packets. Input components 210 may process incoming traffic, such as by performing data link layer encapsulation or decapsulation. In some implementations, input components 310 may send and/or receive packets.

Switching component 220 may interconnect input components 210 with output components 230. Switching component 220 may be implemented using many different techniques. For example, switching component 220 may be implemented via busses, via crossbars, and/or with shared memories. The shared memories may act as temporary buffers to store traffic from input components 210 before the traffic is eventually scheduled for delivery to output components 230. In some implementations, switching component 220 may enable input components 210, output components 230, SPUs 240, and/or routing component 250 to communicate. In some implementations, switching component 220 may distribute packets from input components 210 to SPUs 240 in order to provide load balancing among SPUs 240.

Output components 230 may store packets and may schedule packets for transmission on output physical links. Output components 230 may include scheduling algorithms that support priorities and guarantees. Output components 230 may support data link layer encapsulation or decapsulation, and/or a variety of higher-level protocols. In some implementations, output components 230 may send packets and/or receive packets.

SPU 240 may include one or more processors, microprocessors, application-specific integrated circuits (ASICs), field-programmable gate arrays (FPGAs), or similar types of processing components. In some implementations, SPU 240 may perform high level management functions for device 200, such as, for example, examining a packet received from input component 210 and determining whether security screening is to be performed on the packet. In some implementations, SPU 240 may identify an IP address of a packet as being from a malicious source, and may drop future packets associated with the IP address. SPU 240 may provide the IP address to other SPUs 240 so that the other SPUs 240 may drop future packets associated with the IP address.

Routing component 250 may include one or more processors, microprocessors, ASICs, FPGAs, or similar types of processing components. In some implementations, routing component 250 may communicate with other network devices, networks, and/or systems connected to device 200 to exchange information regarding network topology. Routing component 250 may create routing tables based on the network topology information, create forwarding tables based on the routing tables, and forward the forwarding tables to input components 210 and/or output components 230. Input components 210 and/or output components 230 may use the forwarding tables to perform route lookups for incoming packets.

The number of components shown in FIG. 2 is provided as an example. In practice, device 200 may include additional components, fewer components, different components, or differently arranged components than those shown in FIG. 2. Additionally, or alternatively, one or more components of device 200 may perform one or more functions described as being performed by another one or more components of device 200.

Figure 3:
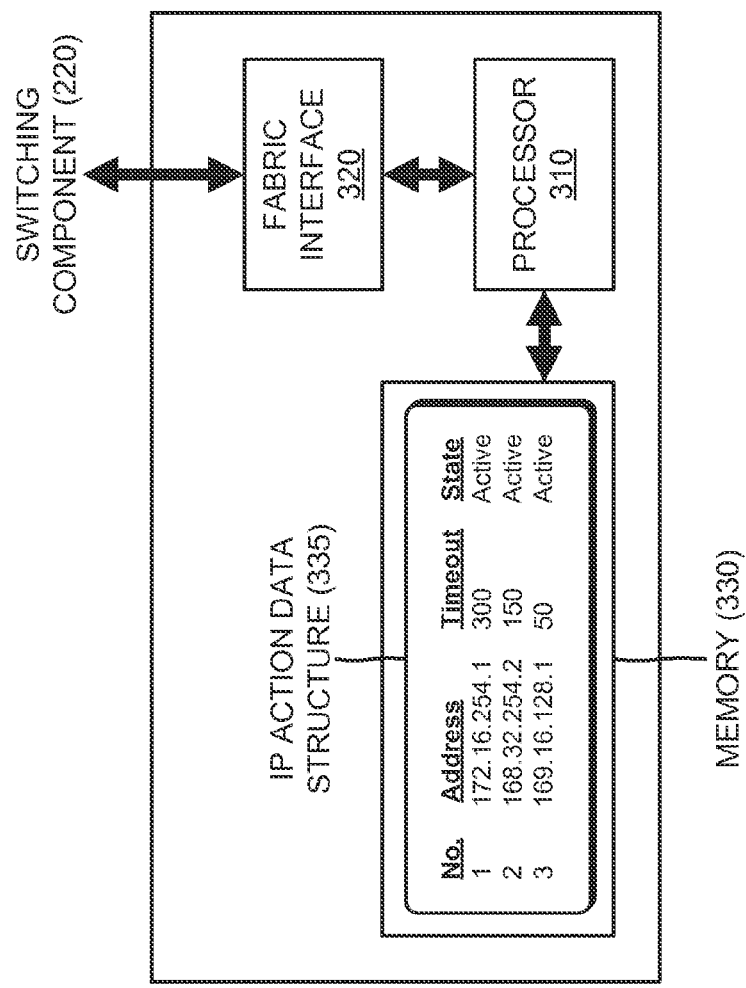
FIG. 3 is a diagram of example components of a security process unit (SPU) shown in FIG. 2.

FIG. 3 is a diagram of example components of SPU 240. As shown, SPU 240 may include a processor 310, a fabric interface 320, and a memory 330 that includes an IP action data structure 335.

Processor 310 may include one or more processors, microprocessors, ASICs, FPGAs, or similar types of processing components. In some implementations, processor 310 may receive, store, process, and/or forward packets. For example, processor 210 may process packets received from input components 210, and may prepare packets for transmission on output components 230. In some implementations, processor 310 may perform certain services on incoming packets.

Fabric interface 320 may include any transceiver-like mechanism that enables SPU 240 to communicate with other devices and/or systems, such as switching component 220 of device 200. In some implementations, fabric interface 320 may include one or more buffers for temporarily storing augmented packets (e.g., packets pre-pended with additional header information) received from processor 310. The buffers may prevent the packets from being dropped if a bottleneck (e.g., a processing delay) develops during packet transport.

Memory 330 may include a random access memory (RAM), a read only memory (ROM), and/or another type of dynamic or static storage component (e.g., a flash, magnetic, or optical memory) that stores information and/or instructions for use by processor 310. In some implementations, memory 330 may temporarily store incoming traffic (e.g., a header of a packet or an entire packet) from input components 210, for processing by processor 310, before a packet is directed back to switching component 220, transported by switching component 220, and/or eventually scheduled to be sent to output components 230.

In some implementations, memory 330 may include IP action data structure 335. IP action data structure 335 may include a table, a database, a list, or another searchable form or arrangement of data within memory 330. In some implementations, IP action data structure 335 may include entries for IP addresses identified as being associated with a malicious source. Each entry may include an IP action number, an IP address, a timeout or aging time period, and a state. When SPU 240 receives a particular packet with a particular IP address, processor 310 may perform a lookup of IP action data structure 335 for the particular IP address. If the particular IP address is provided in IP action data structure 335, SPU 240 may instruct device 200 to drop the particular packet.

SPU 240 may perform various operations described herein. SPU 240 may perform these operations in response to processor 310 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via a communication interface. When executed, software instructions stored in memory 330 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

When SPU 240 receives a packet with an IP address not listed in IP action data structure 335, SPU 240 may create an entry for the IP address in IP action data structure 335, and may distribute the IP address to all other SPUs 240 within device 200. In some implementations, IP action data structure 335 may be configured for a fixed memory size and, thus, may be limited in the number of entries that can be stored in IP action data structure 335. The timeout time period of a particular entry may be reset when SPU 240 identifies activity for the particular entry. If the particular entry experiences no activity for the timeout time period (e.g., a particular number of seconds, minutes, hours, etc.), SPU 240 may determine the particular entry to be "aged out" or inactive. Inactive entries in IP action data structure 335 may eventually be deleted to create room for new entries in IP action data structure 335. In some implementations, a consensus of inactive entries may be determined among all SPUs 240 before the particular entry may be deleted from IP action data structure 335.

The number of components shown in FIG. 3 is provided as an example. In practice, SPU 240 may include additional components, fewer components, different components, or differently arranged components than those shown in FIG. 3. Additionally, or alternatively, one or more components of SPU 240 may perform one or more functions described as being performed by another one or more components of SPU 240.

Figure 4:
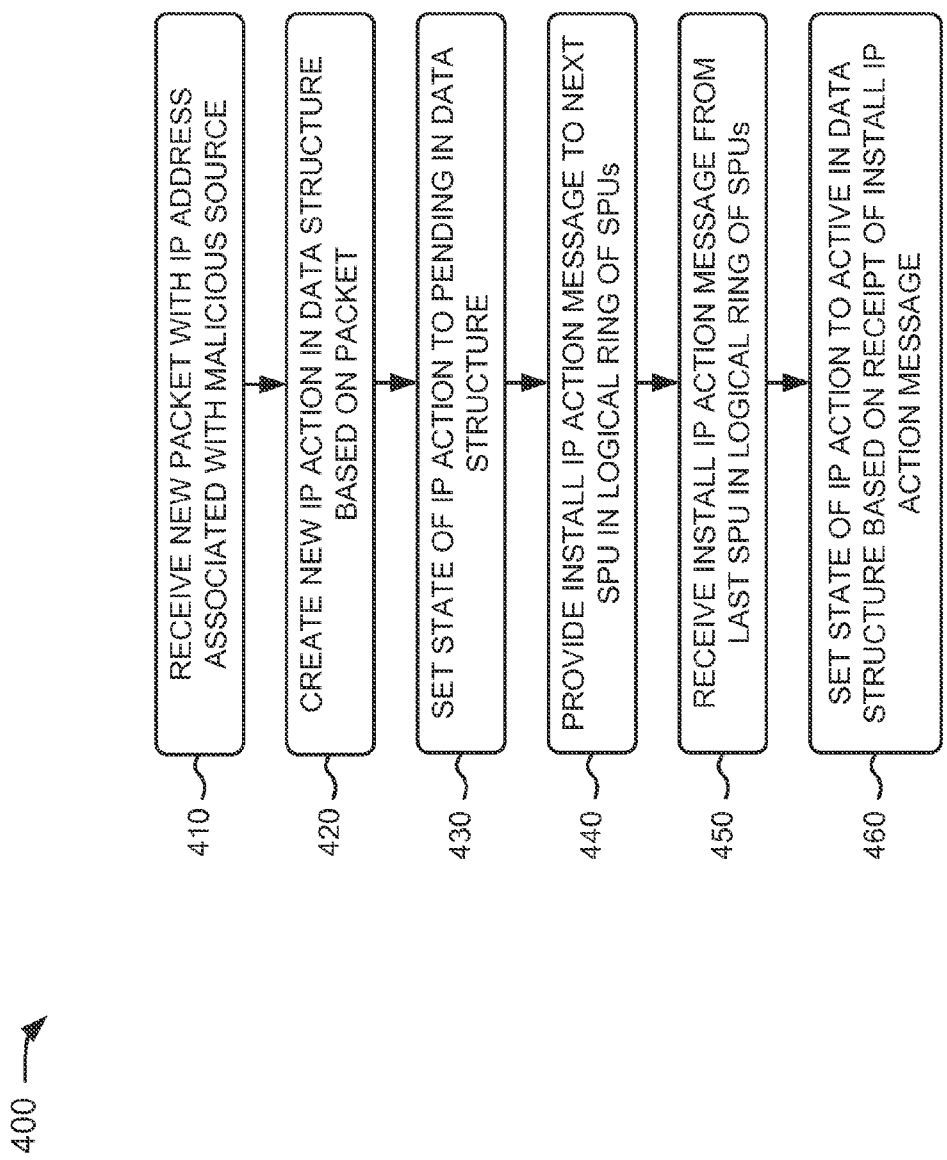
FIG. 4 is a flow chart of an example process for distributing an IP address of a packet to multiple SPUs.

FIG. 4 is a flow chart of an example process 400 for distributing an IP address of a packet to multiple SPUs. In some implementations, process 400 may be performed by device 200. In some implementations, process 400 may be performed by another device or a group of devices separate from or including device 200.

As shown in FIG. 4, process 400 may include receiving a new packet with an IP address associated with a malicious source (block 410). For example, device 200 may receive a new packet with an IP address associated with a source, and may determine that the source is a malicious source. In some implementations, device 200 may determine that the source is attempting to perform malicious network activity, such as, for example, packet sniffing, password cracking, phishing, spreading a virus, spreading a Trojan horse, etc. For example, device 200 may determine that the source is a malicious source based on a comparison of the IP address with a database that includes IP addresses of source devices identified as being malicious.

In some implementations, the new packet may be received by one of SPUs 240 (e.g., SPU 240-1), and SPU 240-1 may determine a source IP address of the new packet. In some implementations, SPU 240-1 may determine a signature based on five tuple (e.g., a source IP address, a destination IP address, a source port, a destination port, and a protocol) of the new packet, and may determine the source IP address based on the signature. In some implementations, SPU 240-1 may determine another identifier (e.g., address) associated with the new based on one or more combinations of information provided in the five tuple. For example the other identifier may include a source IP address and a destination IP address, a source IP address and a source port, etc.

As further shown in FIG. 4, process 400 may include creating a new IP action in a data structure based on the packet (block 420). For example, since SPU 240-1 received the packet, SPU 240-1 may create a new IP action in IP action data structure 335 of SPU 240-1 based on the packet's source IP address. In some implementations, SPU 240-1 may create an IP action entry, in IP action data structure 335, that includes an IP action number (e.g., 1, 2, 3, etc.), a source IP address of the packet (e.g., 169.32.252.1), a timeout time period (e.g., in seconds, minutes, etc.), and a state of the IP action (e.g., pending, active, aging, invalid phase 1, invalid phase 2, etc.).

In some implementations, SPU 240-1 may be deemed the owner or master of the IP action since SPU 240-1 received the packet and created the entry for the action in IP action data structure 335. The remaining SPUs 240 may be deemed non-owners or slaves of the IP action. In some implementations, ownership of an IP action may not change during the existence the IP action in IP action data structure 335, which may eliminate a need to keep track of IP action ownership and simplify management of IP actions.

In some implementations, if two or more SPUs 240 simultaneously receive the packet and create entries in IP action data structures 335, a SPU 240 associated with a smallest identifier (e.g., the identifier of SPU 240-1 is less than the identifier of SPU 240-2 since one is less than two, etc.) may be deemed the owner of the IP action. In some implementations, a SPU 240 associated with a largest identifier (e.g., SPU 240-M) may be deemed the owner of the IP action. In some implementations, ownership of the IP action may be determined based on other techniques, such as, for example, random selection, round robin selection, first SPU 240 to assert ownership, etc.

As further shown in FIG. 4, process 400 may include setting a state of the IP action to pending in the data structure (block 430). For example, SPU 240-1 may initially set the state of the IP action entry in IP action data structure 335 to "pending" (e.g., pending activation of the IP action entry in IP action data structure 335 by the owner, SPU 240-1). In some implementations, SPU 240-1 may maintain the state of the IP action entry as "pending" until SPU 240-1 successfully distributes the IP action to other SPUs 240 of device 200. In some implementations, when the state of the IP action entry is set to "pending," SPU 240-1 may drop received packets with the IP address associated with the IP action entry, but the other SPUs 240 may not drop received packets with the IP address since the IP action entry has not been created by the other SPUs 240.

As further shown in FIG. 4, process 400 may include providing an install IP action message to a next SPU in a logical ring of SPUs (block 440). For example, SPU 240-1 may generate an install IP action message that instructs the other SPUs 240 to install the IP action entry in IP action data structures 335 associated with the other SPUs 240. In some implementations, SPU 240-1 may be arranged with the other SPUs 240 in a logical ring, such as, for example, a logical ring that includes SPU 240-1, SPU 240-2, SPU 240-3, and SPU 240-4. SPU 240-1 may provide the install IP action message to a next SPU 240 (e.g., SPU 240-2) in the logical ring. SPU 240-2 may receive the install IP action message, and may create the IP action entry in IP action data structure 335 associated with SPU 240-2 based on the message. In some implementations, SPU 240-2 may set the state of the IP action entry to "passive" (e.g., pending activation of the IP action entry in IP action data structure 335 by the owner, SPU 240-1) in IP action data structure 335, which may indicate that SPU 240-2 is not an owner of the IP action.

In some implementations, after creating the IP action entry in IP action data structure 335, SPU 240-2 may provide the install IP action message to SPU 240-3. SPU 240-3 may create, based on the install IP action message, the IP action entry in IP action data structure 335 associated with SPU 240-3, and may set the state of the IP action entry to "passive" in IP action data structure 335. After creating the IP action entry in IP action data structure 335, SPU 240-3 may provide the install IP action message to SPU 240-4. SPU 240-4 may create, based on the install IP action message, the IP action entry in IP action data structure 335 associated with SPU 240-4, and may set the state of the IP action entry to "passive" in IP action data structure 335. After creating the IP action entry in IP action data structure 335, SPU 240-4 may return the install IP action message to SPU 240-1.

As further shown in FIG. 4, process 400 may include receiving the install IP action message from a last SPU in the logical ring of SPUs (block 450). For example, SPU 240-1 may receive the install IP action message from a last SPU 240 (e.g., SPU 240-4) in the logical ring. In some implementations, when SPU 240-1 receives the install IP action message from SPU 240-4, SPU 240-1 may determine that the IP action entry has been successfully distributed to and installed by the other SPUs 240. In some implementations, if the install IP action message is not received by SPU 240-1 (e.g., within a particular amount of time), SPU 240-1 may determine that the IP action entry has not been successfully distributed to and installed by the other SPUs 240. If this occurs, SPU 240-1 may resend the install IP action message to the next SPU 240 (e.g., SPU 240-2) in the logical ring (e.g., repeat block 440).

As further shown in FIG. 4, process 400 may include setting the state of the IP action to active in the data structure based on receipt of the install IP action message (block 460). For example, SPU 240-1 may change the state of the IP action entry in IP action data structure 335 from "pending" to "active" when SPU 240-1 receives the install IP action message from SPU 240-4. In some implementations, SPU 240-1 may set the state of the IP action entry to "active" since SPU 240-1 may determine that the IP action entry has been successfully distributed to and installed by the other SPUs 240 when the install IP action message is returned to SPU 240-1.

In some implementations, the other SPUs 240 may change the state of the IP action entry from "passive" to "active" after a particular amount of time (e.g., in seconds, minutes, etc.). In some implementations, the other SPUs 240 may maintain the state of the IP action entry as "passive" if the passive state indicates that the IP action entry is active in the other SPUs 240.

In some implementations, when the state of the IP action entry is set to "active," SPU 240-1 may drop received packets with the IP address associated with the IP action entry, and the other SPUs 240 may drop received packets with the IP address since the IP action entry has been successfully installed by the other SPUs 240. In some implementations, SPUs 240 may quarantine packets with the IP address of the IP action entry, may block packets with the IP address of the IP action entry (e.g., at input components 210, FIG. 2), etc.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
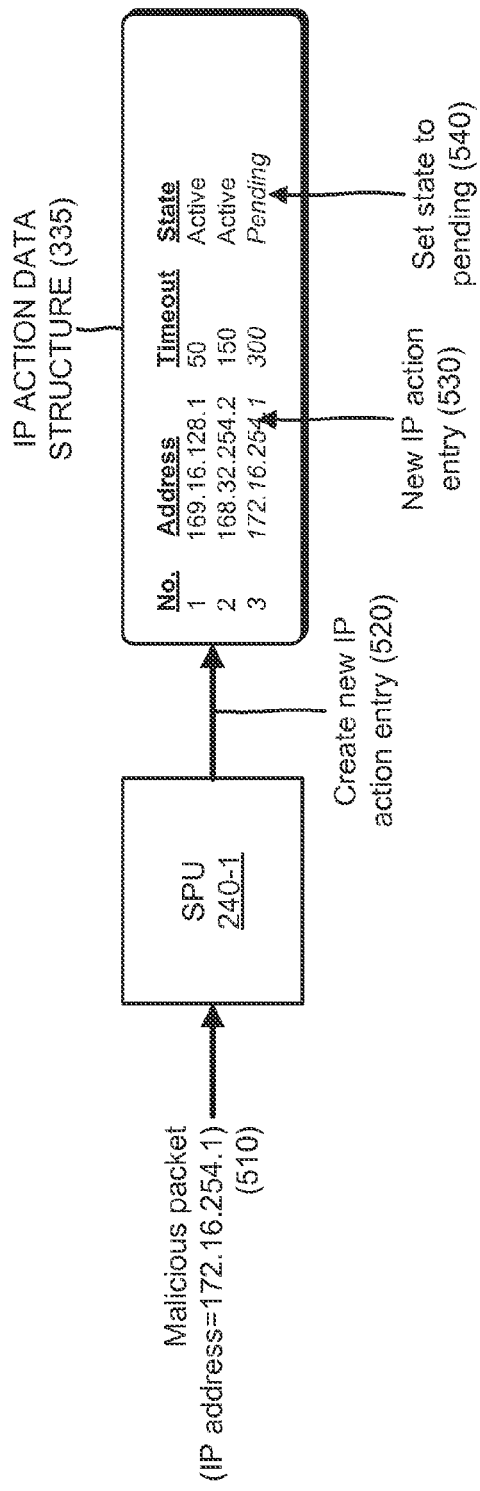
Figure 5B:
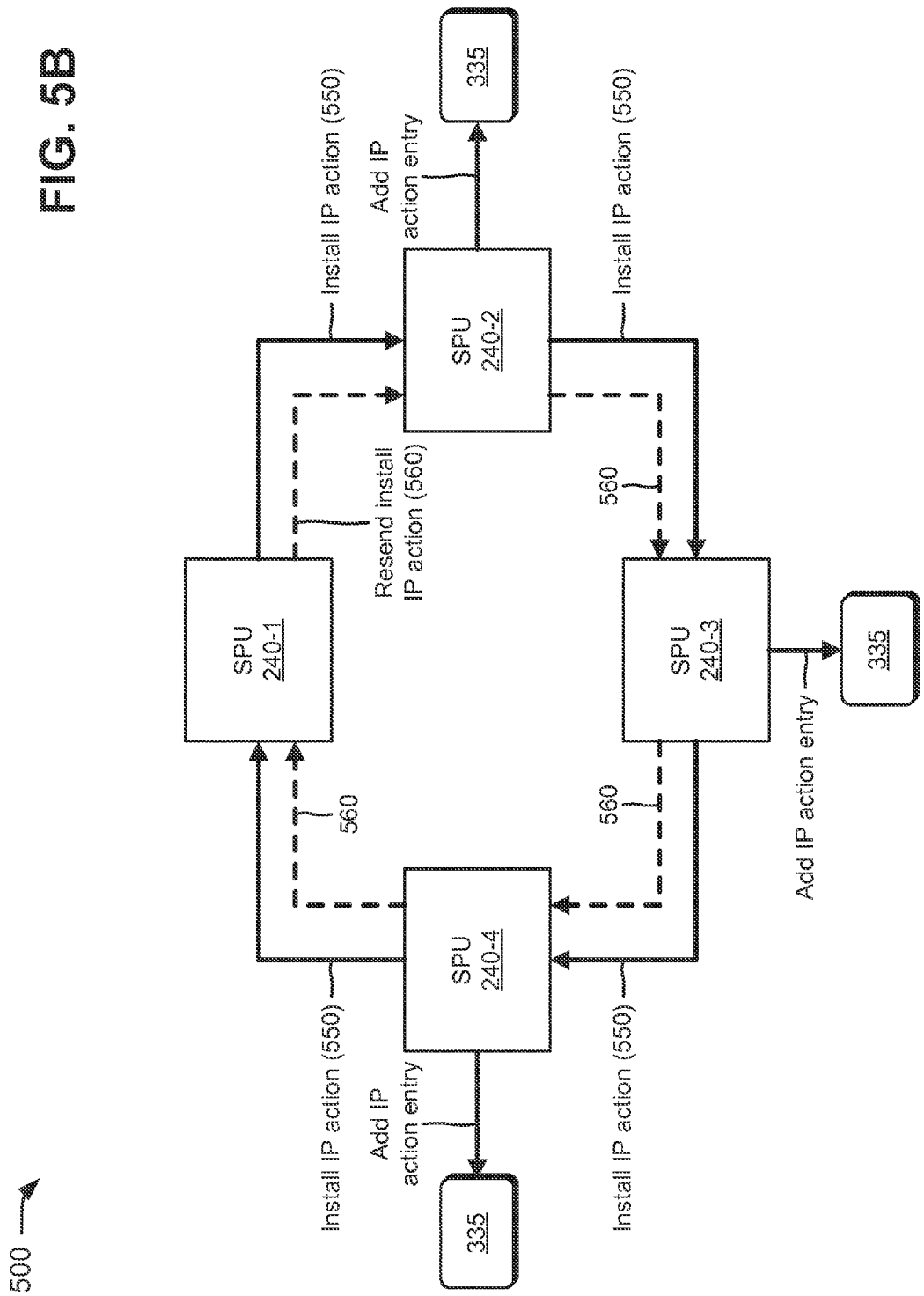
Figure 7A:
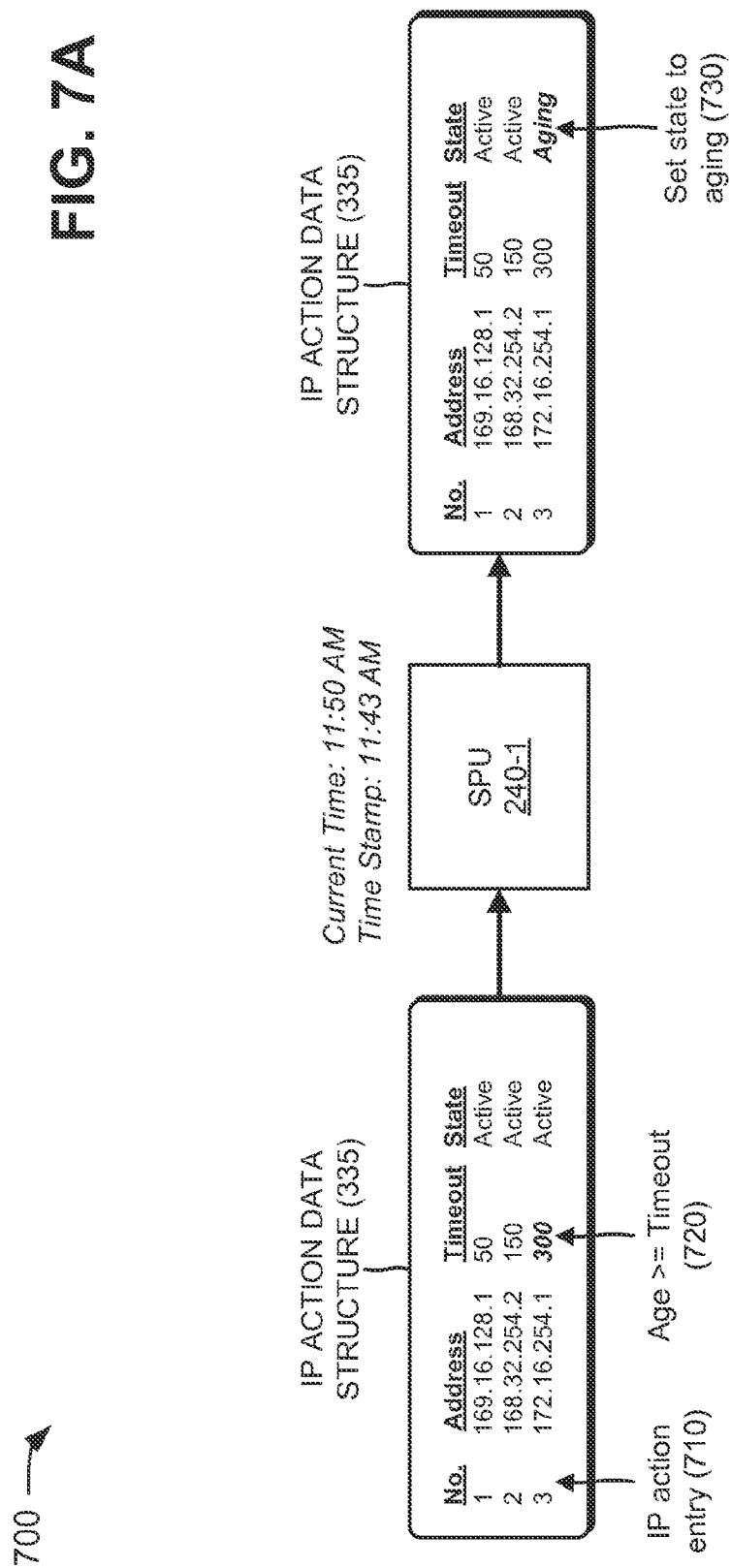
Figure 7E:
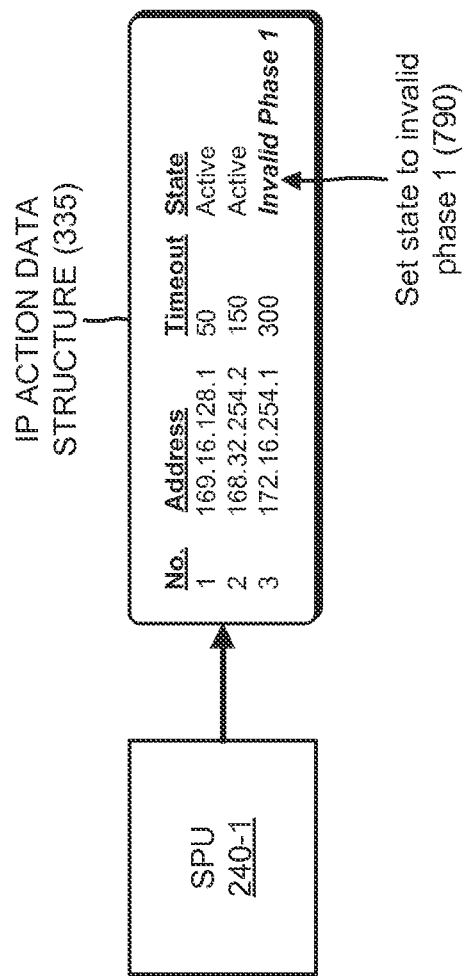

FIGS. 5A-5C are diagrams of an example 500 relating to example process 400 shown in FIG. 4. In example 500, assume that device 200 includes a first SPU 240-1, and that SPU 240-1 receives a packet 510 from a malicious source, as shown in FIG. 5A. Further, assume that packet 510 includes a source IP address of "172.16.254.1" associated with the malicious source. When SPU 240-1 receives packet 510, SPU 240-1 may create, based on packet 510, a new IP action entry in IP action data structure 335, as indicated by reference number 520 in FIG. 5A. As further shown in FIG. 5A, a new IP action entry 530 may be created in IP action data structure 335, and may include an IP action number (e.g., "3"), the source IP address of packet 510 (e.g., "172.16.254.1"), a timeout time period (e.g., "300" seconds), and state information. SPU 240-1 may initially set the state of IP action entry 530 to "pending," as indicated by reference number 540 in FIG. 5A.

After adding IP action entry 530 to IP action data structure 335, SPU 240-1 may generate an install IP action message 550 that instructs the other SPUs 240 to install or add IP action entry 530 in IP action data structures 335 associated with the other SPUs 240. As shown in FIG. 5B, assume that device 200 includes a logical ring of SPUs 240 that includes SPU 240-1, SPU 240-2, SPU 240-3, and SPU 240-4. SPU 240-1 may provide install IP action message 550 to SPU 240-2, and SPU 240-2 may receive install IP action message 550. SPU 240-2 may add IP action entry 530 in IP action data structure 335 associated with SPU 240-2, based on install IP action message 550, and may set the state of IP action entry 530 to "passive" in IP action data structure 335 (e.g., meaning that SPU 240-2 is a non-owner of IP action entry 530). After adding IP action entry 530 in IP action data structure 335, SPU 240-2 may provide install IP action message 550 to SPU 240-3, as further shown in FIG. 5B.

SPU 240-3 may perform the same operations as SPU 240-2, in order to add IP action entry 530 in IP action data structure 335 associated with SPU 240-3, and may forward install IP action message 550 to SPU 240-4. SPU 240-4 may perform the same operations as SPU 240-2, in order to add IP action entry 530 in IP action data structure 335 associated with SPU 240-4, and may return install action message 550 to SPU 240-1.

If one of SPUs 240-2, 240-3, or 240-4 fails to install IP action entry 530 and/or fails to forward install IP action message 550 along the logical ring, SPU 240-1 may not eventually receive install IP action message 550. In such instances, SPU 240-1 may resend install IP action message 550 to SPU 240-2, as indicated by reference number 560 in FIG. 5B.

When SPU 240-1 receives install IP action message 550 from SPU 240-4, SPU 240-1 may change the state of IP action entry 530 in IP action data structure 335 from "pending" to "active," as indicated by reference number 570 in FIG. 5C. SPU 240-1 may set the state of IP action entry 530 to "active" since IP action entry 530 has been successfully distributed to and installed by the other SPUs 240 (e.g., SPU 240-2, SPU 240-3, and SPU 240-4) when install IP action message 550 is returned to SPU 240-1. The other SPUs 240 may change the state of IP action entry 530 from "passive" to "active" after a particular amount of time (e.g., in seconds, minutes, etc.). When the state of IP action entry 530 is set to "active," SPUs 240 may drop any future packets, received by device 200, that include the source IP address of packet 510 (e.g., "172.16.254.1").

As indicated above, FIGS. 5A-5C are provided merely as an example. Other examples are possible and may differ from what was described with regard to FIGS. 5A-5C.

FIG. 6 is a flow chart of an example process 600 for initiating deletion of an IP action entry, associated with of a packet, from multiple SPUs. In some implementations, process 600 may be performed by device 200. In some implementations, process 600 may be performed by another device or a group of devices separate from or including device 200.

As shown in FIG. 6, process 600 may include determining an age of an IP action in a data structure to be greater than a timeout (block 610). For example, SPU 240-1 may determine that an age of an IP action entry in IP action data structure 335 is greater than or equal to a timeout time period of the IP action entry. In some implementations, SPU 240-1 may maintain a time stamp for when the IP action entry is made active in IP action data structure 335. SPU 240-1 may also maintain a timer that is used to determine an age of the IP action entry. For example, the timer may provide a current time (e.g., 12:07 PM), and SPU 240-1 may compare the current time with the time stamp (e.g., 12:01 PM) of the IP action entry. In some implementations, SPU 240-1 may calculate a difference between the current time and the time stamp in order to determine the age of the IP action entry (e.g., 12:07 PM–12:01 PM=6 minutes or 360 seconds). SPU 240-1 may compare the age (e.g., 6 minutes) of the IP action entry with the timeout time period (e.g., 5 minutes) of the IP action entry to determine whether the age is greater than or equal to the timeout time period (e.g., 6 minutes>5 minutes).

As further shown in FIG. 6, process 600 may include setting a state of the IP action to aging in the data structure (block 620). For example, SPU 240-1 may set a state of the IP action entry to "aging" in IP action data structure 335 when SPU 240-1 determines that the age of the IP action entry is greater than or equal to the timeout time period of the IP action entry. In some implementations, by setting the state of the IP action entry to "aging," SPU 240-1 may indicate that the IP action entry has aged out and should be deleted from IP action data structure 335 to make room for new IP action entries. In some implementations, SPU 240-1 may begin a process for deleting the IP action entry when the state of the IP action entry is set to "aging."

As further shown in FIG. 6, process 600 may include providing a delete query message to a next SPU in a logical ring of SPUs (block 630). For example, SPU 240-1 may generate a query message that instructs the other SPUs 240 to determine whether the IP action entry in IP action data structures 335 associated with the other SPUs 240 has aged out. In some implementations, the delete query message may instruct each of the other SPUs 240 to forward the delete query message to a next SPU 240 in the logical ring when the IP action entry has aged out. The delete query message may instruct each of the other SPUs 240 to provide a delete query acknowledgment message to SPU 240-1 when the IP action entry has not aged out.

In some implementations, SPU 240-1 may provide the delete query message to a next SPU 240 (e.g., SPU 240-2) in the logical ring. SPU 240-2 may receive the delete query message, and may determine whether the IP action entry in IP action data structure 335 associated with SPU 240-2 has aged out. In some implementations, SPU 240-2 may determine whether the age of the IP action entry is greater than or equal to the timeout time period of the IP action entry. For example, SPU 240-2 may calculate a difference between the current time (e.g., 12:07 PM) and a time stamp (e.g., 12:04 PM) of the IP action entry in order to determine the age of the IP action entry (e.g., 12:07 PM−12:04 PM=3 minutes). SPU 240-2 may compare the age (e.g., 3 minutes) of the action entry with the timeout time period (e.g., 5 minutes) of the IP action entry to determine whether the age is greater than or equal to the timeout time period (e.g., 3 minutes<5 minutes).

In some implementations, if the age of the IP action entry is greater than or equal to the timeout time period, SPU 240-2 may determine that the IP action entry has aged out. If SPU 240-2 determines that the IP action entry has aged out, SPU 240-2 may forward the delete query message to a next SPU 240 in the logical ring (e.g., to SPU 240-3). In some implementations, if the age of the IP action entry is less than the timeout time period, SPU 240-2 may determine that the IP action entry has not aged out. If SPU 240-2 determines that the IP action entry has not aged out, SPU 240-2 may provide a delete query acknowledgment message to SPU 240-1. The delete query acknowledgment message may indicate that the IP action entry has not aged out at SPU 240-2 and, thus, is not ready to be deleted IP action data structures 335. In some implementations, the delete query acknowledgment message may include a remaining time associated with the IP action entry at SPU 240-2. Using the example above, since the difference between the timeout time period (e.g., 5 minutes) and the age (e.g., 3 minutes) of the IP action entry is two minutes (e.g., 5 minutes−3 minutes=2 minutes), the remaining time of the IP action entry at SPU 240-2 may be two minutes.

In some implementations, if SPU 240-2 forwards the delete query message to a next SPU 240 in the logical ring (e.g., to SPU 240-3), SPU 240-3 may perform the same operations for the delete query message as described above for SPU 240-2. If SPU 240-3 determines that the IP action entry has aged out, SPU 240-3 may forward the delete query message to a next SPU 240 in the logical ring (e.g., to SPU 240-4), and SPU 240-4 may perform the same operations for the delete query message as described above for SPU 240-2. If SPU 240-4 determines that the IP action entry has aged out, SPU 240-4 may return the delete query message to SPU 240-1.

As further shown in FIG. 6, process 600 may include determining whether a delete query acknowledgment (ACK) message is received from the logical ring of SPUs (block 640). For example, SPU 240-1 may determine whether a delete query acknowledgment message is received from one of the other SPUs 240 (e.g., SPU 240-2, SPU 240-3, or SPU 240-4). In some implementations, SPU 240-1 may receive the delete query acknowledgment message from one of the other SPUs 240 when the IP action entry has not completely aged out at one of the other SPUs 240.

As further shown in FIG. 6, if a delete query acknowledgment message is received from the logical ring of SPUs (block 640—YES), process 600 may include setting, in the data structure, the state of the IP action to active and the age of the IP action to a remaining time provided in the delete query acknowledgment message (block 650). For example, if SPU 240-1 receives a delete query acknowledgment message from one of the other SPUs 240, SPU 240-1 may determine that the IP action entry is still active and not ready to be deleted. Thus, SPU 240-1 may change the state of the IP action entry, in IP action data structure 335, from "aging" back to "active." In some implementations, SPU 240-1 may set the age of the IP action entry to the remaining time provided in the delete query acknowledgment message. For example, if the delete query acknowledgment message indicates that the remaining time associated with the IP action entry at SPU 240-2 is two minutes, SPU 240-1 may set the age of the IP action entry, at SPU 240-1, to be two minutes. In some implementations, SPU 240-1 may update the time stamp of the IP action entry so that the age of the IP action entry is set to the remaining time. For example, if the current time is 12:07 PM, SPU 240-1 may change the time stamp of the IP action entry to 12:05 PM so that the age of the IP action entry is two minutes (e.g., 12:07 PM−12:05 PM=2 minutes).

As further shown in FIG. 6, if a delete query acknowledgment message is not received from the logical ring of SPUs (block 640—NO), process 600 may include receiving the delete query message from a last SPU in the logical ring of SPUs (block 660). For example, if the other SPUs 240 in the logical ring do not provide a delete query acknowledgment message to SPU 240-1, a last SPU 240 in the logical ring (e.g., SPU 240-4) may provide the delete query message to SPU 240-1. In some implementations, the other SPUs 240 in the logical ring may forward the delete query message until the delete query message reaches SPU 240-1. In some implementations, SPU 240-1 may determine that the IP action entry is ready to be deleted by the other SPUs 240 when the delete query message is received by SPU 240-1.

As further shown in FIG. 6, process 600 may include setting the state of the IP action to invalid phase 1 in the data structure based on receipt of the delete query message (block 670). For example, if SPU 240-1 receives the delete query message, SPU 240-1 may change the state of the IP action entry, in IP action data structure 335, from "aging" to "invalid phase 1" based on receiving the delete query message. In some implementations, setting the state of the IP action entry to "invalid phase 1," may cause SPU 240-1 to generate a delete IP action message, as described below in connection with FIGS. 8-9C.

In some implementations, if the state of the IP action entry is set to "aging" by SPU 240-1 and SPU 240-1 receives a packet with an IP address that matches the IP action entry, SPU 240-1 may refresh the IP action entry in IP action data structure 335. When SPU 240-1 refreshes the IP action entry, SPU 240-1 may reset the state of the IP action entry to "active" and may reset the time stamp of the IP action entry to the current time (e.g., which may set the age of the IP action entry to zero). After refreshing the IP action entry, SPU 240-1 may ignore a delete query message or a delete query acknowledgment message received from the other SPUs 240 since the IP action entry has been reset.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7E are diagrams of an example 700 relating to example process 600 shown in FIG. 6. In the example 700, assume that device 200 includes a first SPU 240-1. Further, assume that SPU 240-1 determines that an age of an IP action entry 710 (e.g., IP action entry number 3), provided in IP action data structure 335, is greater than or equal to a timeout (e.g., "300" seconds) associated with IP action entry 710, as indicated by reference number 720 in FIG. 7A. For example, SPU 240-1 may determine the age of IP action entry 710 based on a difference (e.g., 7 minutes or "420" seconds) between a current time (e.g., 11:50 AM) and a time stamp (e.g., 11:43 AM) of IP action entry 710. As further shown in FIG. 7A, when SPU 240-1 determines that the age of IP action entry 710 is greater than the timeout, SPU 240-1 may change a state of IP action entry 710, in IP action data structure 335, from "active" to "aging," as indicated by reference number 730.

After setting the state of IP action entry 710 to "aging," SPU 240-1 may provide a delete query message 740 to other SPUs 240 of device 200, such as SPU 240-2. Delete query message 740 may instruct SPU 240-2 to determine whether IP action entry 710 has aged at SPU 240-2. Assume that IP action entry 710 has aged out at SPU 240-2, and that, accordingly, SPU 240-2 forwards delete query message 740 to SPU 240-3, as further shown in FIG. 7B. Assume that SPU 240-3 receives a packet 750 with an IP address that matches the IP address (e.g., 172.16.254.1) of IP action entry 710. SPU 240-3 may reset an age of IP action entry 710 based on receipt of packet 750. Thus, SPU 240-3 may determine, based on delete query message 740, that IP action entry 710 has not aged out at SPU 240-3. Based on this determination, SPU 240-3 may provide, to SPU 240-1, a delete query acknowledgment 760 that indicates that IP action entry 710 has not aged out at SPU 240-3. As further shown in FIG. 7B, delete query acknowledgment 760 may include a remaining time (e.g., two minutes) associated with IP action entry 710 at SPU 240-3. In some implementations, SPU 240-3 may provide delete query acknowledgment 760 to SPU 240-1 via the remaining SPUs 240 in the logical ring (e.g., via SPU 240-4).

When SPU 240-1 receives delete query acknowledgment 760, SPU 240-1 may determine that IP action entry 710 is still active at SPU 240-3 and not ready to be deleted. Thus, SPU 240-1 may change the state of IP action entry 710, in IP action data structure 335, from "aging" back to "active," as indicated by reference number 770 in FIG. 7C. SPU 240-1 may set the age of IP action entry 710 to the remaining time (e.g., two minutes) provided in delete query acknowledgment 760. For example, SPU 240-1 may update the time stamp of IP action entry 710 so that the age of IP action entry 710 is set to two minutes. If the current time is 11:50 AM, assume that SPU 240-1 changes the time stamp of IP action entry 710 to 11:48 AM so that the age of action entry 710 is two minutes (e.g., 11:50 AM–11:48 AM=2 minutes), as indicated by reference number 780 in FIG. 7C.

Now assume that SPU 240-1 determines, at a later time, that the age of IP action entry 710 is greater than or equal to the timeout associated with IP action entry 710. SPU 240-1 may change the state of IP action entry 710 from "active" to "aging," and may provide delete query message 740 to SPU 240-2 again, as shown in FIG. 7D. Delete query message 740 may instruct SPU 240-2 to determine whether IP action entry 710 has aged out at SPU 240-2. Assume that IP action entry 710 has aged out at SPU 240-2, and that, accordingly, SPU 240-2 forwards delete query message 740 to SPU 240-3, as further shown in FIG. 7D. Further, assume that IP action entry 710 has aged out at SPU 240-3 and SPU 240-4, and, accordingly, that delete query message 740 is forwarded from SPU 240-3 to SPU 240-4 and finally to SPU 240-1.

When SPU 240-1 receives delete query message 740, SPU 240-1 may determine that IP action entry 710 is not active at the other SPUs 240 and is ready to be deleted. Thus, SPU 240-1 may change the state of IP action entry 710, in IP action data structure 335, from "aging" to "invalid phase 1," as indicated by reference number 790 in FIG. 7E. As this point, SPU 240-1 may be ready to begin the process for deleting IP action en 710, as described below in connection with FIGS. 8-9C.

As indicated above, FIGS. 7A-7E are provided merely as an example. Other examples are possible and may differ from what was described with regard to FIGS. 7A-7E.

FIG. 8 is a flow chart of an example process 800 for completing deletion of an IP entry, associated with a packet, from multiple SPUs. In some implementations, process 800 may be performed by device 200. In some implementations, process 800 may be performed by another device or a group of devices separate from or including device 200.

As shown in FIG. 8, process 800 may include determining a state of an IP action in a data structure to be invalid phase 1 (block 810). For example, if SPU 240-1 receives back a delete query message generated by SPU 240-1, SPU 240-1 may change a state of an IP action entry, in IP action data structure 335, from "aging" to "invalid phase 1" based on receiving the delete query message. In some implementations, when SPU 240-1 sets the state of the IP action entry to "invalid phase 1," SPU 240-1 may begin a process for deleting the IP action entry from IP action data structures 335 associated with SPU 240-1 and the other SPUs 240.

As further shown in FIG. 8, process 800 may include providing a delete IP action message to a next SPU in a logical ring of SPUs (block 820). For example, when SPU 240-1 sets the state of the IP action entry to "invalid phase 1," SPU 240-1 may generate a delete IP action message. The delete IP action message may instruct the other SPUs 240 to change the state of the IP action entry, in IP action data structures 335 of the other SPUs 240, to "invalid phase 1," and to forward the delete IP action message to a next SPU 240. In some implementations, SPU 240-1 may provide the delete IP action message to a next SPU 240 (e.g., SPU 240-2) of the logical ring of SPUs 240.

SPU 240-2 may receive the delete IP action message, and may change the state of the IP action entry, in IP action data structure 335 of SPU 240-2, to "invalid phase 1" based on the delete IP action message. The IP action entry may timeout (e.g., after a particular amount of time in seconds, minutes, etc.) when the state of the IP action entry is "invalid phase 1," which may cause SPU 240-2 to change the state of the IP action entry to "invalid phase 2." The IP action entry may timeout (e.g., after a particular amount of time in seconds, minutes, etc.) when the state of the IP action entry is "invalid phase 2," which may cause SPU 240-2 to delete the IP action entry from IP action data structure 335 associated with SPU 240-2. In some implementations, SPU 240-2 may forward the delete IP action message to SPU 240-3, and SPU 240-3 may perform the same operations as SPU 240-2. SPU 240-3 may forward the delete IP action message to SPU 240-4, and SPU 240-4 may perform the same operations as SPU 240-2 and may return the delete IP action message back to SPU 240-1.

As further shown in FIG. 8, process 800 may include receiving the delete IP action message from a last SPU in the logical ring of SPUs (block 830). For example, SPU 240-1 may receive the delete IP action message from a last SPU 240 (e.g., SPU 240-4) in the logical ring of SPUs 240. When SPU 240-1 receives the delete IP action message, SPU 240-1 may determine that the IP action entry is ready to be deleted by all of the other SPUs 240.

As further shown in FIG. 8, process 800 may include setting the state of the IP action to invalid phase 2 in the data structure based on receipt of the delete IP action message (block 840). For example, if SPU 240-1 receives back the delete IP action message, SPU 240-1 may change the state of the IP action entry, in IP action data structure 335, from "invalid phase 1" to "invalid phase 2" based on receiving the delete IP action message. In some implementations, setting the state of the IP action entry to "invalid phase 2," may cause SPU 240-1 to start a timeout timer associated with deleting the IP action entry from IP action data structure 335.

As further shown in FIG. 8, process 800 may include deleting the IP action from the data structure based on the state of the IP action being set to invalid phase 2 in the data structure (block 850). For example, the IP action entry may timeout (e.g., after a particular amount of time in seconds, minutes, etc.) when the state of the IP action entry is "invalid phase 2," which may cause SPU 240-1 to delete the IP action entry from IP action data structure 335. In some implementations, when SPU 240-1 sets the state of the IP action entry to "invalid phase 2," SPU 240-1 may start the timeout timer, and the timeout timer may eventually expire. Expiration of the timeout timer may cause SPU 240-1 to delete the IP action entry from IP action data structure 335.

In some implementations, once the IP action entry enters the "invalid phase 1" or "invalid phase 2" states, the IP action entry may not be refreshed and made active again even if a packet with an IP address matching the IP action entry is received by device 200.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9A:
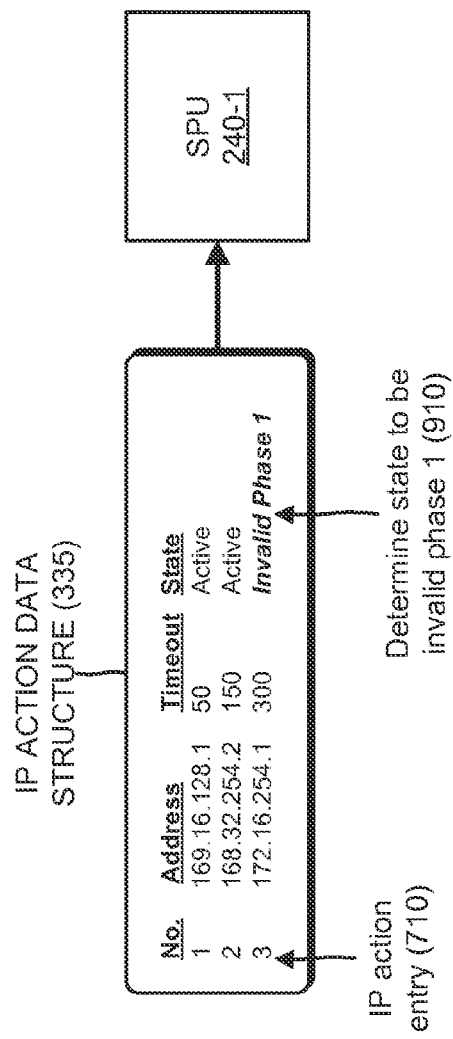
FIGS. 9A-9C are diagrams of an example relating to the example process shown in FIG. 8.
Figure 9B:
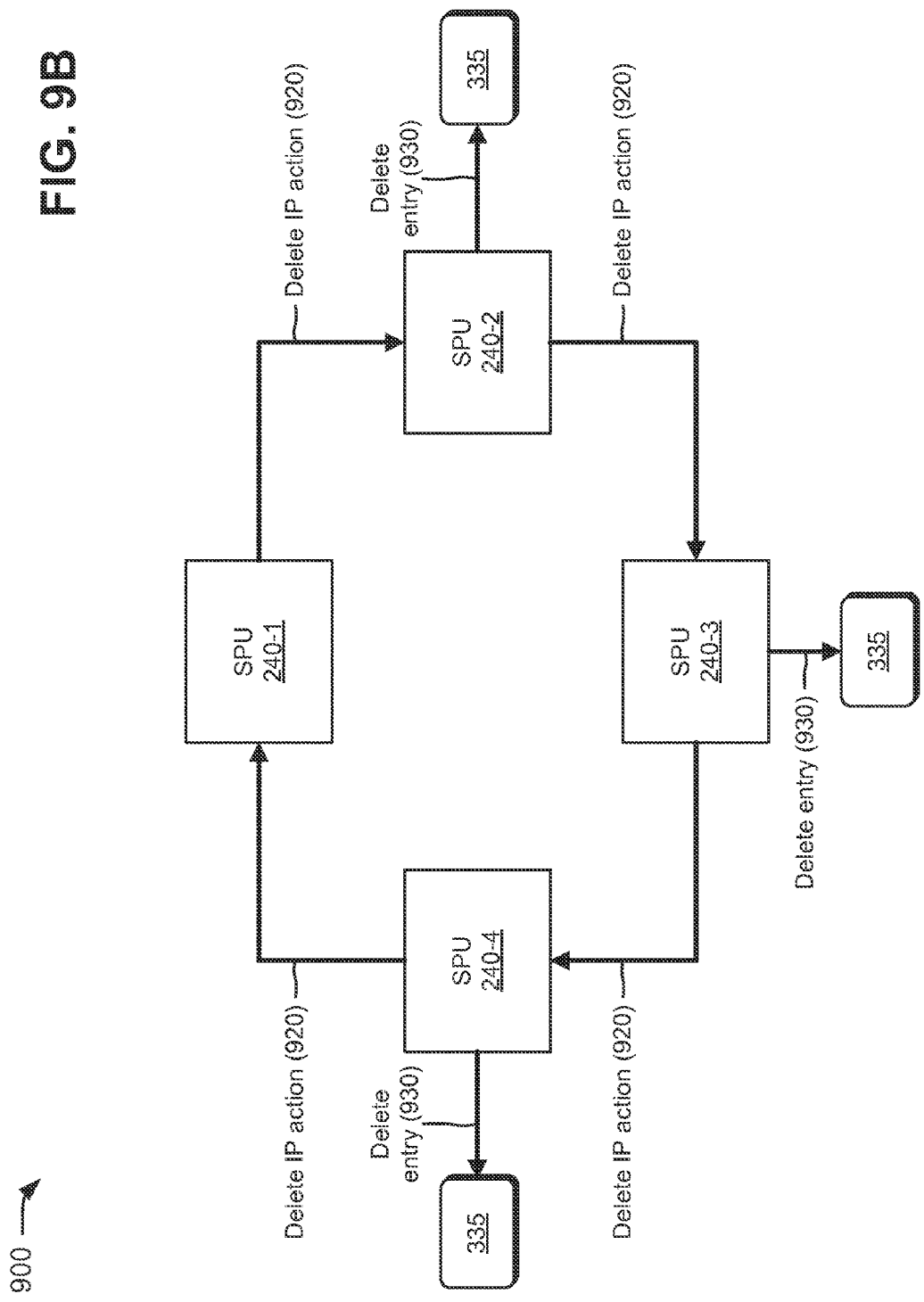
Figure 9C:
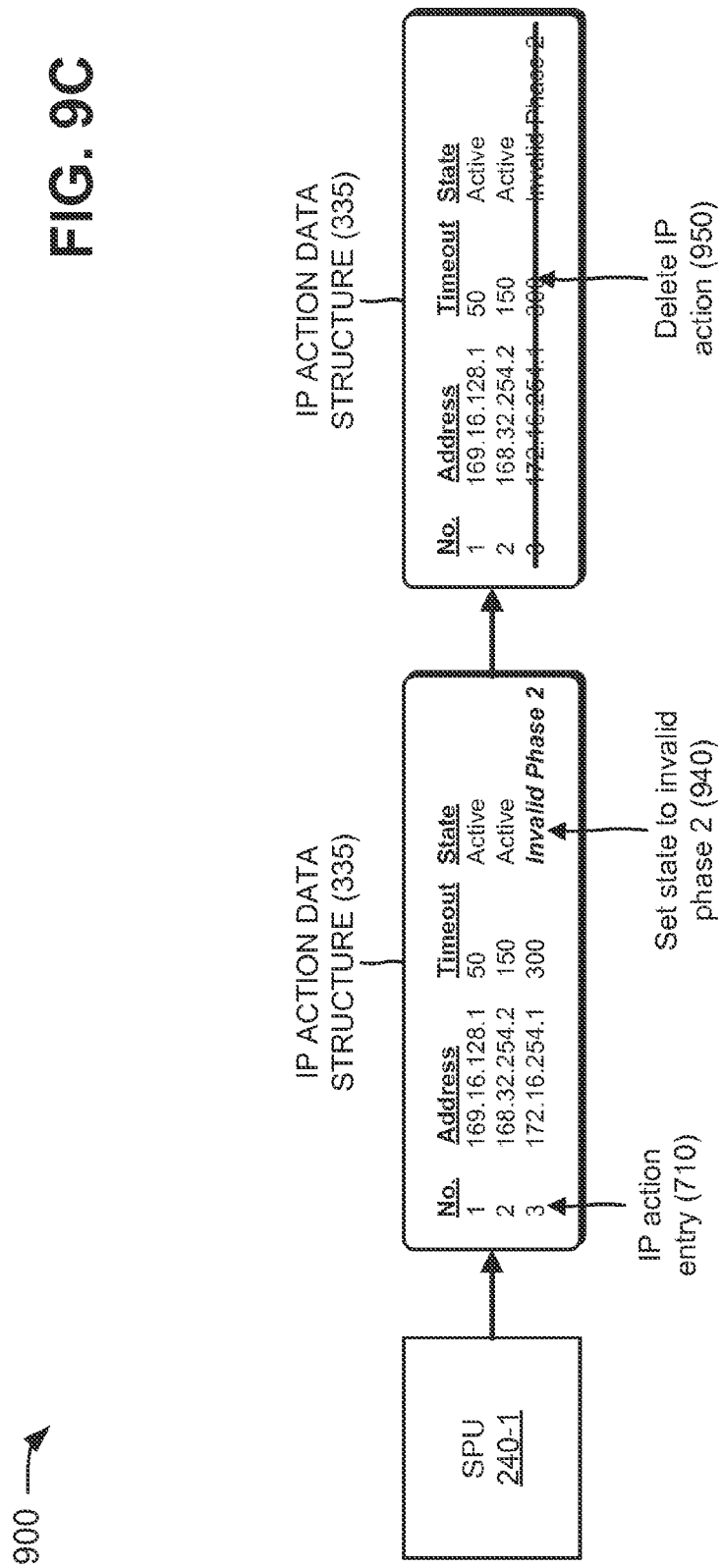

FIGS. 9A-9C are diagrams of an example 900 relating to example process 800 shown in FIG. 8. In the example 900, assume that SPU 240-1 determines that a state of IP action entry 710 (FIG. 7A) is "invalid phase 1" in IP action data structure 335, as indicated by reference number 910 in FIG. 9A. When SPU 240-1 determines that the state of IP action entry 710 is "invalid phase 1," SPU 240-1 may provide a delete IP action message 920 to a next SPU 240 (e.g., SPU 240-2) in a logical ring of SPUs 240, as shown in FIG. 9B. Delete IP action message 920 may instruct each of the other SPUs 240, in the logical ring, to change the state of IP action entry 710 to "invalid phase 1," and to forward delete IP action message 920 to a next SPU 240.

SPU 240-2 may receive delete IP action message 920, and may change the state of IP action entry 710 to "invalid phase 1," in IP action data structure 335 of SPU 240-2, based on delete IP action message 920. IP action entry 710 may timeout (e.g., after a number of seconds) when the state of IP action entry 710 is "invalid phase 1," which may cause SPU 240-2 to change the state of IP action entry 710 to "invalid phase 2." IP action entry 710 may timeout (e.g., after a number of seconds) when the state of IP action entry 710 is "invalid phase 2," which may cause SPU 240-2 to delete IP action entry 710 from IP action data structure 335 of SPU 240-2, as indicated by reference number 930 in FIG. 9B. As further shown in FIG. 9B, SPU 240-2 may forward delete IP action message 920 to SPU 240-3, and SPU 240-3 may delete IP action entry 710 from IP action data structure 335 of SPU 240-3, as indicated by reference number 930, based on delete IP action message 920. SPU 240-3 may forward delete IP action message 920 to SPU 240-4, and SPU 240-4 may delete IP action entry 710 from IP action data structure 335 of SPU 240-4, as indicated by reference number 930, based on delete IP action message 920. SPU 240-4 may return delete IP action message 920 to SPU 240-1.

When SPU 240-1 receives delete IP action message 920 from SPU 240-4, SPU 240-1 may change the state of IP action entry 710, in IP action data structure 335, from "invalid phase 1" to "invalid phase 2," as indicated by reference number 940 in FIG. 9C. IP action entry 710 may timeout (e.g., after a number of seconds) when the state of IP action entry 710 is "invalid phase 2," which may cause SPU 240-1 to delete IP action entry 710 from IP action data structure 335, as indicated by reference number 950 in FIG. 9C.

As indicated above, FIGS. 9A-9C are provided merely as an example. Other examples are possible and may differ from what was described with regard to FIGS. 9A-9C.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A method comprising:
receiving, by a device, a packet with an address associated with a malicious source,
the device including a plurality of security process units (SPUs) arranged in a logical ring of SPUs, and
a particular SPU, of the logical ring of SPUs, receiving the packet, creating, by the particular SPU and based on the packet, an
action entry in a data structure associated with the particular SPU,
the action entry including information associated with
the packet;
setting, by the particular SPU, a state of the action entry to
pending in the data structure;
providing, by the particular SPU and based on setting the
state of the action entry to pending, an install message to
a next SPU in the logical ring of SPUs,
the install message instructing the next SPU to:
create the action entry in another data structure associated with the next SPU, and
forward the install message to another SPU in the
logical ring of SPUs;
receiving, by the particular SPU, the install message from
a last SPU in the logical ring of SPUs; and
setting, by the particular SPU, the state of the action entry
to active in the data structure based on receiving the
install message from the last SPU,
the device performing a particular action on another
packet, associated with the malicious source, based
on setting the state of the action entry to active.

2. The method of claim 1, further comprising:
starting, by the particular SPU, a timer when the state of the
action entry is set to active; and
determining, by the particular SPU, an age of the action
entry in the data structure based on the timer.

3. The method of claim 2, further comprising:
determining, by the particular SPU, the age of the action
entry to be greater than or equal to a time period;
setting, by the particular SPU, the state of the action entry
to aging in the data structure based on the age of the
action entry being greater than or equal to the time
period; and
providing, by the particular SPU, a delete query message to
the next SPU in the logical ring of SPUs,
the delete query message instructing the next SPU to:
determine whether the action entry in the other data
structure is ready to be deleted, and
forward the delete query message to the other SPU in
the logical ring of SPUs when the action entry is
ready to be deleted.

4. The method of claim 3, further comprising:
receiving, by the particular SPU, an acknowledgment message from one of the SPUs in the logical ring of SPUs,
the acknowledgment message indicating that the action
entry is not ready to be deleted at the one of the SPUs,
and
the acknowledgment message including a remaining
time associated with the action entry at the one of the
SPUs;
setting, by the particular SPU, the state of the action entry
to active in the data structure based on the acknowledgment message; and
setting, by the particular SPU, the time period of the action
entry in the data structure to reflect the remaining time
provided in the acknowledgment message.

5. The method of claim 3, further comprising:
receiving, by the particular SPU, the delete query message
from the last SPU in the logical ring of SPUs; and
setting, by the particular SPU, the state of the action entry
to invalid in the data structure based on receiving the
delete query message from the last SPU.

6. The method of claim 5, further comprising:
providing, by the particular SPU, a delete message to the
next SPU in the logical ring of SPUs when the state of the
action entry is set to invalid,
the delete message instructing the next SPU to:
delete the action entry from the other data structure,
and
forward the delete message to the other SPU in the
logical ring of SPUs;
receiving, by the particular SPU, the delete message from
the last SPU in the logical ring of SPUs; and
deleting, by the particular SPU, the action entry from the
data structure based on receiving the delete message
from the last SPU.

7. The method of claim 1, where the action entry includes
information associated with an Internet protocol (IP) address
of the packet.

8. A device comprising:
a memory to store a data structure; and
a security process unit (SPU), associated with a logical ring
of SPUs, to:
receive a packet with an address associated with a malicious source,
create, based on the packet, an action entry in the data
structure,
the action entry including information associated
with the packet,
set a state of the action entry to pending in the data
structure,
provide, based on setting the state of the action entry to
pending, an install message to a next SPU in the
logical ring of SPUs,
the install message instructing the next SPU to:
create the action entry in another data structure
associated with the next SPU, and
forward the install message to another SPU in the
logical ring of SPUs,
receive the install message from a last SPU in the logical
ring of SPUs,
set the state of the action entry to active in the data
structure based on receiving the install message from
the last SPU, and
perform a particular action on another packet, associated
with the malicious source, based on the setting the
state of the action entry to active.

9. The device of claim 8, where the SPU is further to:
start a timer when the state of the action entry is set to
active, and
determine an age of the action entry in the data structure
based on the timer.

10. The device of claim 9, where the SPU is further to:
determine the age of the action entry to be greater than or
equal to a time period, and
provide, based on the age of the action entry being greater
than or equal to the time period, a delete query message
to the next SPU in the logical ring of SPUs,
the delete query message instructing the next SPU to:
determine whether the action entry in the other data
structure is ready to be deleted, and
forward the delete query message to the other SPU in
the logical ring of SPUs when the action entry is
ready to be deleted.

11. The device of claim 10, where the SPU is further to:
receive an acknowledgment message from one of the SPUs
in the logical ring of SPUs,
the acknowledgment message:
indicating that the action entry is not ready to be
deleted at the one of the SPUs, and including a remaining time associated with the action entry at the one of the SPUs, and set the time period of the action entry in the data structure to reflect the remaining time provided in the acknowledgment message.

12. The device of claim 10, where the SPU is further to:
receive the delete query message from the last SPU in the logical ring of SPUs, and
set the state of the action entry to invalid in the data structure based on receiving the delete query message from the last SPU.

13. The device of claim 12, where the SPU is further to:
provide a delete message to the next SPU in the logical ring of SPUs when the state of the action entry is set to invalid,
the delete message instructing the next SPU to:
delete the action entry from the other data structure, and
forward the delete message to the other SPU in the logical ring of SPUs,
receive the delete message from the last SPU in the logical ring of SPUs, and
delete the action entry from the data structure based on receiving the delete message from the last SPU.

14. The device of claim 8, where the action entry includes information associated with an Internet protocol (IP) address of the packet.

15. A non-transitory computer-readable medium for storing instructions, the instructions comprising:
one or more instructions that, when executed by a security process unit (SPU), associated with a logical ring of SPUs of a device, cause the SPU to:
receive a packet with an address associated with a malicious source,
create, based on the packet, an action entry in a data structure associated with the particular SPU,
the action entry including information associated with the packet,
provide an install message to a next SPU in the logical ring of SPUs,
the install message instructing the next SPU to:
create the action entry in another data structure associated with the next SPU, and
forward the install message to another SPU in the logical ring of SPUs,
receive the install message from a last SPU in the logical ring of SPUs,
set a state of the action entry to active in the data structure based on receiving the install message from the last SPU, and
perform a particular action on another packet, associated with the malicious source, based on the setting the state of the action entry to active.

16. The computer-readable medium of claim 15, where the instructions further comprise:
one or more instructions that, when executed by the SPU, cause the SPU to:
determine an age of the action entry to be greater than or equal to a time period, and
provide, based on the age of the action entry being greater than or equal to the time period, a delete query message to the next SPU in the logical ring of SPUs,
the delete query message instructing the next SPU to:
determine whether the action entry in the other data structure is ready to be deleted, and
forward the delete query message to the other SPU in the logical ring of SPUs when the action entry is ready to be deleted.

17. The computer-readable medium of claim 16, where the instructions further comprise:
one or more instructions that, when executed by the SPU, cause the SPU to:
receive an acknowledgment message from one of the SPUs in the logical ring of SPUs,
the acknowledgment message indicating that the action entry is not ready to be deleted at the one of the SPUs, and
the acknowledgment message including a remaining time associated with the action entry at the one of the SPUs, and
set the time period of the action entry in the data structure to reflect the remaining time provided in the acknowledgment message.

18. The computer-readable medium of claim 16, where the instructions further comprise:
one or more instructions that, when executed by the SPU, cause the SPU to:
receive the delete query message from the last SPU in the logical ring of SPUs, and
set the state of the action entry to invalid in the data structure based on receiving the delete query message from the last SPU.

19. The computer-readable medium of claim 18, where the instructions further comprise:
one or more instructions that, when executed by the SPU, cause the SPU to:
provide a delete message to the next SPU in the logical ring of SPUs when the state of the action entry is set to invalid,
the delete message instructing the next SPU to:
delete the action entry from the other data structure, and
forward the delete message to the other SPU in the logical ring of SPUs,
receive the delete message from the last SPU in the logical ring of SPUs, and
delete the action entry from the data structure based on receiving the delete message from the last SPU.

20. The computer-readable medium of claim 15, where the action entry includes information associated with an Internet protocol (IP) address of the packet.

* * * * *